US012712182B2

(12) United States Patent
Kubota et al.

(10) Patent No.: US 12,712,182 B2
(45) Date of Patent: Aug. 18, 2026

(54) NEGATIVE ELECTRODE ACTIVE MATERIAL, NEGATIVE ELECTRODE, AND SECONDARY BATTERY

(71) Applicant: MURATA MANUFACTURING CO., LTD., Kyoto (JP)

(72) Inventors: Hironobu Kubota, Kyoto (JP); Yosuke Koike, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1162 days.

(21) Appl. No.: 17/720,878

(22) Filed: Apr. 14, 2022

(65) Prior Publication Data

US 2022/0246930 A1 Aug. 4, 2022

Related U.S. Application Data

(63) Continuation of application No. PCT/JP2020/039113, filed on Oct. 16, 2020.

(30) Foreign Application Priority Data

Oct. 18, 2019 (JP) ................................ 2019-191389

(51) Int. Cl.
*H01M 4/62* (2006.01)
*H01M 4/04* (2006.01)
(Continued)

(52) U.S. Cl.
CPC ......... *H01M 4/525* (2013.01); *H01M 4/0404* (2013.01); *H01M 4/505* (2013.01); *H01M 4/60* (2013.01); *H01M 2004/027* (2013.01)

(58) Field of Classification Search
None
See application file for complete search history.

(56) References Cited

U.S. PATENT DOCUMENTS

2012/0100428 A1* 4/2012 Popall .................. H01M 4/383 29/623.5
2014/0154583 A1* 6/2014 Ueki .................. H01M 10/625 429/246

(Continued)

FOREIGN PATENT DOCUMENTS

CN 103996835 8/2014
CN 105098163 11/2015

(Continued)

OTHER PUBLICATIONS

Machine translation of CN103996835A from Espacenet (Year: 2014).*

(Continued)

*Primary Examiner* — Maria Laios
*Assistant Examiner* — Zackary Richard Cochenour
(74) *Attorney, Agent, or Firm* — K&L Gates LLP

(57) ABSTRACT

The present disclosure provides a negative electrode active material for a battery, exhibiting sufficiently excellent initial charge-discharge efficiency and cycle characteristics by suppressing physical deterioration of a film due to expansion and contraction of a core material. The negative electrode active material for a battery, comprising: a negative electrode active material core material; and a film provided on a surface of the negative electrode active material core material. The film includes an organic-inorganic hybrid film having a reactant. The reactant at least includes a first metal alkoxide including no metal atom-carbon atom bond in a molecule; and a second metal alkoxide including two or more of metal atom-carbon atom bonds in a molecule.

18 Claims, 2 Drawing Sheets

(51) Int. Cl.

| | |
|---|---|
| ***H01M 4/505*** | (2010.01) |
| ***H01M 4/525*** | (2010.01) |
| ***H01M 4/60*** | (2006.01) |
| *H01M 4/02* | (2006.01) |

(56) References Cited

U.S. PATENT DOCUMENTS

2014/0315086 A1* 10/2014 Put .................... H01M 4/134
429/218.1
2015/0325839 A1 11/2015 Put et al.
2019/0081323 A1 3/2019 Tahara

FOREIGN PATENT DOCUMENTS

JP H09171813 A 6/1997
JP 2004335334 A 11/2004
JP 2008004534 A 1/2008
JP 2008177122 A 7/2008
JP 2010015895 A 1/2010
JP 2010272477 A 12/2010
JP 2012-169249 9/2012
JP 2016507859 A 3/2016
JP 2017183101 A 10/2017
WO 2014095811 A1 6/2014
WO 2017126337 A1 7/2017

OTHER PUBLICATIONS

Machine translation of CN105098163A from Espacenet (Year: 2015).*

Japanese Office Action issued Feb. 28, 2023 in corresponding Japanese Application No. 2021-552469.

European Search Report issued Dec. 5, 2023 in corresponding European Application No. 20875725.2.

Chinese Office Action issued Jul. 7, 2023 in corresponding Chinese Application No. 202080069099.4.

International Search Report of corresponding PCT application PCT/JP2020/039113, dated Dec. 8, 2020.

Japanese Office Action issued Aug. 8, 2023 in corresponding Japanese Application No. 2021-552469.

* cited by examiner

NEGATIVE ELECTRODE ACTIVE MATERIAL, NEGATIVE ELECTRODE, AND SECONDARY BATTERY

ROSS REFERENCE TO RELATED APPLICATIONS

The present application is a continuation of PCT patent application no. PCT/JP2020/039113, filed on Oct. 16, 2020, which claims priority to Japanese patent application no. JP2019-191389 filed on Oct. 18, 2019, the entire contents of which are being incorporated herein by reference.

BACKGROUND

The present technology generally relates to a negative electrode active material, a negative electrode, and a secondary battery.

Conventionally, secondary batteries have been used as power sources for various electronic devices. A secondary battery generally has a structure in which an electrode assembly (electrode body) and an electrolyte are housed in an exterior body (case), and further includes an external terminal (or an electrode lead) for achieving electrical connection of the secondary battery. The electrode assembly has a structure in which a positive electrode and a negative electrode are disposed with a separator interposed therebetween.

The positive electrode and the negative electrode have a positive electrode layer including a positive electrode active material and a negative electrode layer including a negative electrode active material, respectively. In the secondary battery, ions are brought in an electrolyte due to "the positive electrode active material included in the positive electrode layer" and "the negative electrode active material included in the negative electrode layer", and such ions move between the positive electrode and the negative electrode to transfer electrons, and charge and discharge are thus performed. In recent years, Li-ion secondary batteries using lithium ions as ions have been widely used as power sources for electronic devices because of excellent characteristics of high voltage and high energy density. Recently, miniaturization and high performance of electronic devices have been advanced, and there is an increasing demand for further increase in energy density of Li-ion secondary batteries.

Current Li-ion secondary batteries mainly use $LiCoO_2$ as a positive electrode and graphite as a negative electrode. Although graphite of the negative electrode is excellent in reversibility of charge and discharge, the discharge capacity thereof has already reached a value close to a theoretical value of 372 mAh/g corresponding to the interlayer compound $LiC_6$. Therefore, in order to achieve higher energy density, it is necessary to develop a negative electrode material having a discharge capacity larger than that of graphite. As a negative electrode material in place of graphite, a Si-based material has attracted attention as an active material that forms an alloy with Li having a discharge capacity far exceeding that of graphite. Metal particles or alloy particles that occlude and release Li have a higher capacity density than graphite that has been conventionally used as a negative electrode active material. For this reason, using these as active materials can increase the capacity of the battery; however, these materials undergo volume expansion when absorbing Li and contract when releasing Li, and therefore there easily occur cracking of the particles themselves and cracking and peeling of a generated solid electrolyte interface film (hereinafter, referred to as "SEI film"). The expansion coefficient tends to increase as the metal or alloy has a higher capacity density. When the Si-based negative electrode material having a high capacity occludes Li, the Si-based negative electrode material expands up to about 4 times in volume, and thus cracking thereof or breakage of the formed SEI film particularly easily proceeds. For this reason, reductive decomposition of the electrolytic solution is promoted during charge, and cycle characteristics at a practical level are not obtained.

Therefore, there has been disclosed a technique capable of suppressing decomposition of an electrolytic solution by coating a Si-based negative electrode material or the like with a specific metal oxide or metal.

SUMMARY

The present technology generally relates to a negative electrode active material, a negative electrode, and a secondary battery.

The present disclosure has disclosed that the following problems occur. Specifically, as shown in FIG. 3, a conventional negative electrode active material 100 has a negative electrode active material core material 101 and a film 102 formed on the surface of the negative electrode active material core material, and expansion and contraction are repeated by charge and discharge. In this case, the conventional film 102 does not have sufficient followability (or recoverability) to expansion and contraction, and therefore with the expansion and contraction, physical deterioration such as cracks 1020, pinholes 1021, and peeling 1022 from the negative electrode active material core material 101 easily occurred in the film 102 as shown in FIG. 4. As a result, a new negative electrode material surface was generated to promote the decomposition of the electrolytic solution, and thus the cycle characteristics were rapidly deteriorated. In addition, the further decomposition of the electrolytic solution promoted the cracking of each part of the particles and the side reaction of the electrolytic solution, whereby the side reaction product further increased the particle volume or further deteriorated the charge-discharge efficiency. FIG. 3 is a schematic sectional view of a negative electrode active material for explaining expansion and contraction in a conventional negative electrode active material. FIG. 4 is a schematic sectional view showing a surface state of a conventional negative electrode active material.

An object of the present disclosure is to provide a negative electrode active material for a battery, exhibiting sufficiently excellent initial charge-discharge efficiency and cycle characteristics by suppressing physical deterioration of a film due to expansion and contraction of a core material.

According to an embodiment of the present disclosure, a negative electrode active material for a battery is provided. The negative electrode active material includes:

- a negative electrode active material core material; and
- a film provided on a surface of the negative electrode active material core material, wherein the film includes an organic-inorganic hybrid film having a reactant at least including:
- a first metal alkoxide including no metal atom-carbon atom bond in a molecule; and
- a second metal alkoxide including two or more of metal atom-carbon atom bonds in a molecule.

The negative electrode active material of the present disclosure can exhibit sufficiently excellent initial charge-discharge efficiency and cycle characteristics by suppressing physical deterioration (for example, cracking, pinholes, and peeling off from the negative electrode active material core material) of the film due to expansion and contraction of the core material.

DETAILED DESCRIPTION

Figure 1:
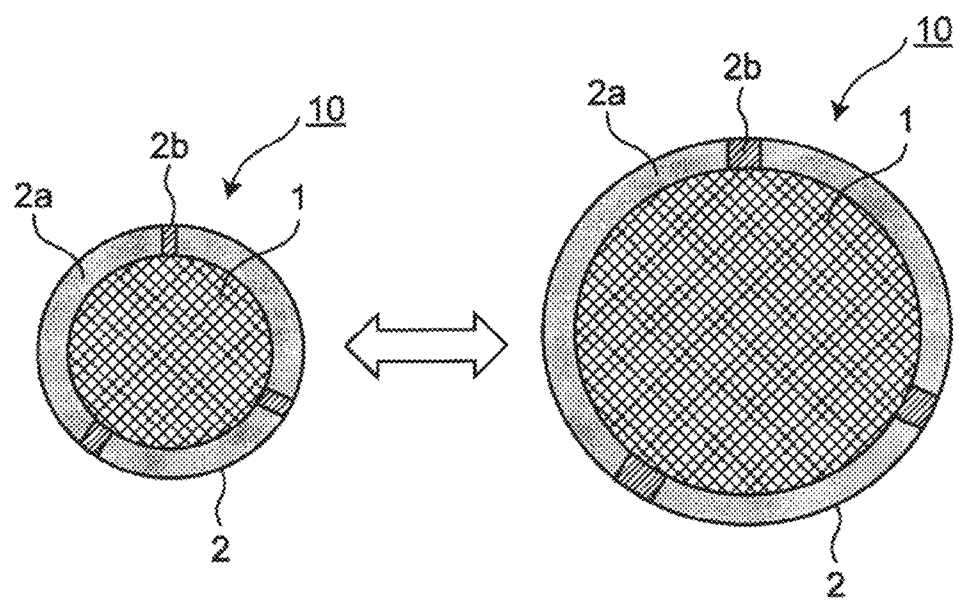
FIG. 1 is a schematic sectional view of a negative electrode active material for explaining expansion and contraction in the negative electrode active material according to an embodiment of the present disclosure.

As shown in FIG. 1, a negative electrode active material 10 of the present disclosure has a negative electrode active material core material 1 and a film 2 formed on the surface of the negative electrode active material core material 1, and expansion and contraction may be repeated by charge and discharge. FIG. 1 is a schematic sectional view of a negative electrode active material for explaining expansion and contraction in the negative electrode active material of the present disclosure.

The negative electrode active material core material 1 is a material that contributes to occlusion and release of ions that transfer electrons by moving between the positive electrode and the negative electrode, and is preferably a material that contributes to occlusion and release of lithium ions from the viewpoint of increasing the battery capacity. From such a viewpoint, the negative electrode active material core material is preferably, for example, various silicon-based materials, carbon-based materials, or mixtures thereof. From the viewpoint of further increasing the battery capacity, the negative electrode active material core material is preferably a silicon-based material.

The silicon-based material is a generic term for materials including silicon (Si) as a constituent element. The silicon-based material may be a simple substance of silicon, may be an alloy of silicon, or may be a compound of silicon. In addition, the silicon-based material may be a material having any one or two or more phases of the above simple substance, alloy, and compound in at least a part thereof. The silicon-based material may be crystalline or amorphous. Silicon shall be classified into the category of metals.

The simple substance of silicon is a simple substance in a general sense. That is, the purity of the simple substance is not necessarily 100%, and the simple substance may include a trace amount of impurities.

The alloy of silicon may include two or more of metal elements as constituent elements, or may include one or more of metal elements and one or more of metalloid elements as constituent elements. In addition, the alloy of silicon described above may further include one or more of nonmetallic elements as constituent elements. The structure of the alloy of silicon is, for example, a solid solution, a eutectic (eutectic mixture), an intermetallic compound, and a coexisting material of two or more thereof. The metal element and the metalloid element included as constituent elements in the alloy of silicon are, for example, any one or two or more of metal elements and metalloid elements capable of forming an alloy with the electrode reactant. Specific examples thereof include magnesium, boron, aluminum, gallium, indium, germanium, tin, lead, bismuth, cadmium, silver, zinc, hafnium, zirconium, yttrium, palladium, and platinum. The alloy of silicon includes, for example, any one or two or more of tin, nickel, copper, iron, cobalt, manganese, zinc, indium, silver, titanium, germanium, bismuth, antimony, and chromium as a constituent element other than silicon.

The compound of silicon includes, for example, any one or two or more of carbon and oxygen as a constituent element other than silicon. The compound of silicon may include, for example, as a constituent element other than silicon, any one or two or more of the series of elements described for the alloy of silicon.

Examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SiTi_w$ ($0<w\leq2$), and LiSiO. v in $SiO_v$ may be $0.2<v<1.4$. w in $SiTi_w$ may be $0.01\leq v\leq0.5$.

The carbon-based material is a generic term for materials including carbon as a constituent element. The type of the carbon-based material is not particularly limited, and examples thereof include graphitizable carbon, non-graphitizable carbon, and graphite (natural graphite, artificial graphite). However, the interplanar spacing of the (002) plane with respect to the non-graphitizable carbon is preferably, for example, 0.37 nm or more, and the interplanar spacing of the (002) plane with respect to the graphite is preferably, for example, 0.34 nm or less. More specifically, examples of the carbon-based material include pyrolytic carbons, cokes, glassy carbon fibers, organic polymer compound fired bodies, activated carbon, and carbon blacks. Examples of the cokes include pitch coke, needle coke, or petroleum coke. The organic polymer compound fired body is a fired (carbonized) product of a polymer compound, and the polymer compound is, for example, any one or two or more of a phenol resin and a furan resin. In addition, the carbon-based material may be, for example, low crystalline carbon subjected to a heat treatment at a temperature of about 1000° C. or less, or amorphous carbon. The carbon-based material may be hard carbon, soft carbon, or diamond-shaped carbon.

The shape of the carbon-based material is not particularly limited, and is, for example, fibrous, spherical (particulate), and scaly. Of course, carbon-based materials having two or more types of shapes may be mixed.

The negative electrode active material core material may be a metal oxide including a metal other than silicon. Examples of such a metal oxide include at least one selected from the group consisting of tin oxide, indium oxide, zinc oxide, and lithium oxide.

The average particle size of the negative electrode active material core material is not particularly limited, and may be, for example, 1 μm or more and 50 μm or less, particularly 1 μm or more and 40 μm or less. The average particle size described herein is the median diameter D50 (μm), and the same applies hereinafter.

When the negative electrode active material core material is a silicon-based material, the average particle size (median diameter D50) is preferably 1 μm or more and 10 μm or less from the viewpoint of suppressing side reactions of the electrolytic solution and suppressing expansion.

When the negative electrode active material core material is a carbon-based material, the average particle size (median diameter D50) is preferably 5 μm or more and 40 μm or less from the viewpoint of suppressing side reactions of the electrolytic solution and suppressing expansion.

A film 2 is an organic-inorganic hybrid film, and is formed of a composite of an organic component and an inorganic component. Specifically, the film 2 is formed of a reactant including at least a first metal alkoxide and a second metal alkoxide as monomer components. More specifically, the film 2 is not formed by stacking a plurality of layers formed of each of the metal alkoxides; however, has a network structure (single layer structure) formed of a reactant of the metal alkoxide. The film 2 is composed of a reactant including at least a first metal alkoxide and a second metal alkoxide, and therefore has high flexibility (recoverability) and high resistance to expansion and contraction of the core material.

Figure 2:
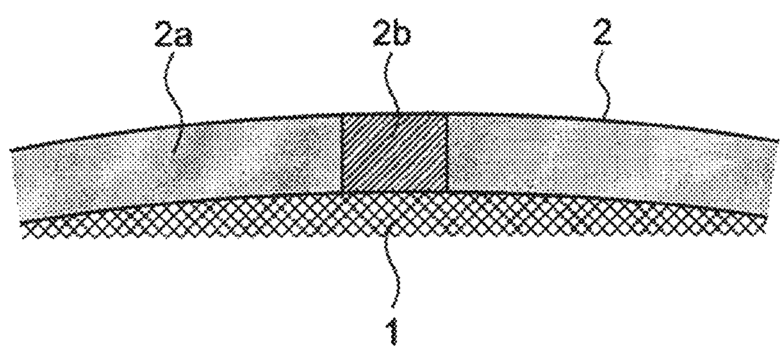
FIG. 2 is a schematic sectional view showing a surface state of the negative electrode active material according to an embodiment of the present disclosure.
Figure 3:
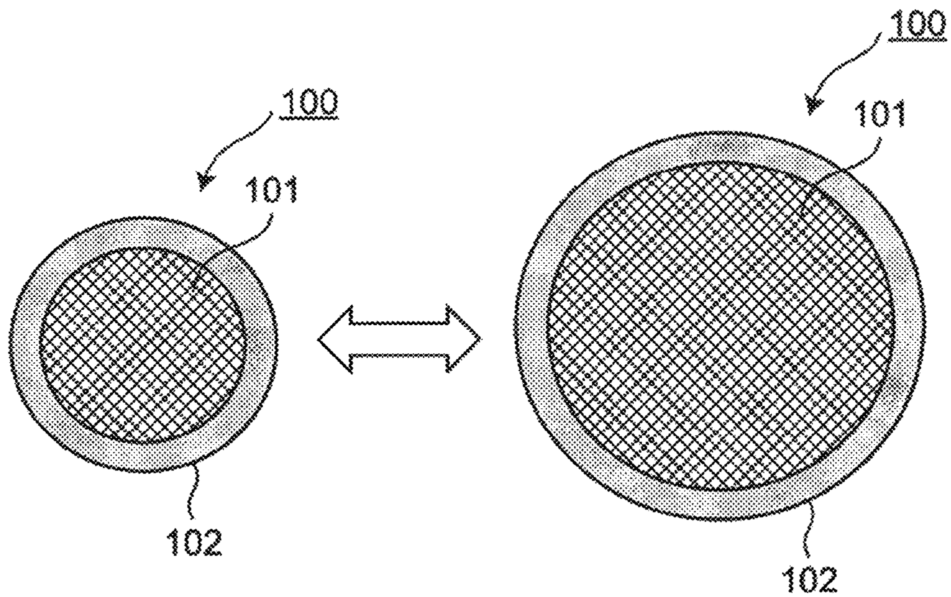
FIG. 3 is a schematic sectional view of a negative electrode active material for explaining expansion and contraction in a conventional negative electrode active material.
Figure 4:
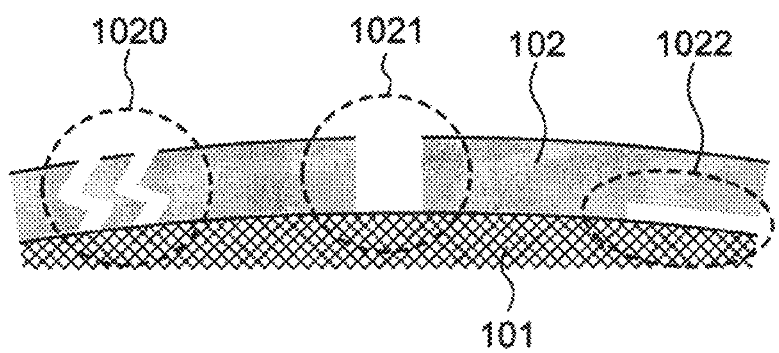
FIG. 4 is a schematic sectional view showing a surface state of a conventional negative electrode active material.

Specifically, although the negative electrode active material core material repeats expansion and contraction by charge and discharge, the film 2 can sufficiently follow such expansion and contraction. Therefore, it is considered that physical deterioration of the film 2 due to expansion and contraction of the core material 1 can be sufficiently suppressed, and sufficiently excellent initial charge-discharge efficiency and cycle characteristics can be obtained. Details of the mechanism by which such an effect is obtained in the present disclosure are not clear; however, are considered to be based on the following mechanism. The film 2 is specifically composed of a reactant containing at least a first metal alkoxide and a second metal alkoxide, and therefore, as shown in FIG. 1, the film 2 includes an inorganic portion 2*a* and an organic portion 2*b*. The inorganic portion 2*a* is a portion based on both the first metal alkoxide and the second metal alkoxide, and the organic portion 2*b* is a portion based on a part of the second metal alkoxide. The organic portion 2*b* has higher flexibility than the inorganic portion 2*a*, and therefore when a core material 1 expands (refer to the right side in FIG. 1) or contracts (refer to the left side in FIG. 1), it is possible to sufficiently suppress the physical deterioration of the film 2 by following the expansion and contraction of the core material as illustrated in FIG. 2. The film 2 can be designed as an inorganic material having characteristics (flexibility) of the organic material by hybridization of an organic material and an inorganic material. For example, an organic material represented by plastic is light, excellent in processability, and has flexibility and impact resistance. Whereas, the organic material is inferior in heat resistance and material stability to the inorganic material. In contrast, the inorganic material such as silica and glass is excellent in durability and heat resistance; however, is often heavy and vulnerable to impact (brittle, less flexible). In the present disclosure, the film 2 is an organic-inorganic hybrid material, and therefore it is possible to incorporate both of these characteristics. When the film does not include the second metal alkoxide, the film cannot sufficiently follow the expansion and contraction of the core material, thus the physical deterioration of the film is not sufficiently suppressed, and sufficiently excellent initial charge-discharge efficiency and cycle characteristics are not obtained. FIG. 2 is a schematic sectional view showing a surface state of the negative electrode active material of the present disclosure.

The film 2 typically has an average film thickness of, for example, 0.1 nm or more and 20 nm or less (particularly 0.5 nm or more and 15 nm or less).

The first metal alkoxide is a metal alkoxide including no metal atom-carbon atom bond in one molecule, and is a metal alkoxide in which all bonds of the metal are bonded to alkoxy groups (—$OR^1$). In the first metal alkoxide, the metal atom-carbon atom bond is a direct covalent bond between a metal atom and a carbon atom. In the first metal alkoxide, the carbon atom constituting the metal atom-carbon atom bond is a carbon atom constituting a monovalent hydrocarbon group (for example, an alkyl group and an alkenyl group) or a carbon atom constituting a divalent hydrocarbon group (for example, an alkylene group). The first metal alkoxide has no metal atom-carbon atom bond described above in one molecule. Therefore, the first metal alkoxide constitutes the film 2, and fixes the film 2 to the negative electrode active material core material 1 by relatively strong bonding.

The first metal alkoxide is specifically a compound represented by the following general formula (1):

[Chemical Formula 1]

$$M^1(OR^1)_x \quad (1)$$

wherein, $M^1$ is a metal atom and is Si, Ti, Al, or Zr, and is preferably Si, Ti, or Al, more preferably Si or Ti, and still more preferably Si, from the viewpoint of further improving the initial charge-discharge efficiency and cycle characteristics of the negative electrode active material.

x is the valence of $M^1$. When $M^1$ is Si, Ti or Zr, x is 4. When $M^1$ is Al, x is 3.

$R^1$ is each independently an alkyl group having 1 to 10 carbon atoms or a group represented by the general formula: —C($R^2$)═CH—CO—$R^3$ (wherein $R^2$ and $R^3$ are as described below), and is preferably an alkyl group having 1 to 5 carbon atoms from the viewpoint of further improving the initial charge-discharge efficiency and cycle characteristics of the negative electrode active material. Examples of the alkyl group as $R^1$ include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. For a plurality of $R^1$ s according to the number of x, all $R^1$ s may be each independently selected from the above alkyl groups, or all $R^1$ s may be mutually the same group selected from the above alkyl groups.

$R^2$ is an alkyl group having 1 to 10 carbon atoms, and is preferably an alkyl group having 1 to 5 carbon atoms from the viewpoint of further improving the initial charge-discharge efficiency and cycle characteristics of the negative electrode active material. Examples of the alkyl group as $R^2$ include the same alkyl group as the alkyl group as $R^1$.

$R^3$ is an alkyl group having 1 to 30 carbon atoms, an alkyloxy group having 1 to 30 carbon atoms, or an alkenyloxy group having 1 to 30 carbon atoms, and from the viewpoint of further improving the initial charge-discharge efficiency and cycle characteristics of the negative electrode active material, $R^3$ is preferably an alkyl group having 1 to 20 carbon atoms (more preferably 1 to 10, still more preferably 1 to 5), an alkyloxy group having 10 to 30 carbon atoms (particularly 14 to 24), or an alkenyloxy group having 10 to 30 carbon atoms (particularly 14 to 24). Preferable examples of the alkyl group as $R^3$ include an alkyl group similar to the alkyl group as $R^1$, and an undecyl group, a lauryl group, a tridecyl group, a myristyl group, a pentadecyl group, a cetyl group, a heptadecyl group, a stearyl group, a nonadecyl group, and an eicosyl group. Examples of the alkyloxy group as $R^3$ include a group represented by the formula: —O—$C_pH_{2p+1}$ (wherein p is an integer of 1 to 30). Examples of the alkyloxy group as $R^3$ include a group represented by the formula: —O—$C_qH_{2q-1}$ (wherein q is an integer of 1 to 30).

In the formula (1), two adjacent $R^1$ s among a plurality of $R^1$ s may be bonded to each other to form one ring (for example, a 5 to 8 membered ring, particularly a 6 membered ring) together with an oxygen atom to which the two $R^1$ s are bonded and an $M^1$ atom to which the oxygen atom is bonded in the case of an alkyl group. Examples of one ring formed by bonding two adjacent $R^1$ s to each other include a 6-membered ring represented by general formula (1x):

[Chemical Formula IX]

(1X)

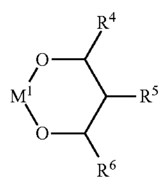

wherein, $R^4$, $R^5$, and $R^6$ are each independently a hydrogen atom or an alkyl group having 1 to 10 carbon atoms, and from the viewpoint of further improving the initial charge-discharge efficiency and cycle characteristics of the negative electrode active material, $R^4$, $R^5$, and $R^6$ are preferably a hydrogen atom or an alkyl group having 1 to 5 carbon atoms. The total number of carbon atoms of $R^4$, $R^5$, and $R^6$ is typically 0 to 12, and is preferably 2 to 8 from the viewpoint of further improving the initial charge-discharge efficiency and cycle characteristics of the negative electrode active material. In the formula (1X), examples of the alkyl group as $R^4$, $R^5$, and $R^6$ include the same alkyl group as the alkyl group as $R^1$.

Examples of the first metal alkoxide include compounds represented by the following general formulas (1A), (1B), (1B'), (1C), and (1D). From the viewpoint of further improving the initial charge-discharge efficiency and cycle characteristics of the negative electrode active material, the first metal alkoxide is preferably a compound represented by the general formula (1A), (1B), (1C), or (1D) or a mixture thereof, more preferably a compound represented by the general formula (1A), (1B), or (1C) or a mixture thereof, still more preferably a compound represented by the general formula (1A) or (1B) or a mixture thereof, and particularly preferably a compound represented by the general formula (1A) or a mixture thereof.

[Chemical Formula 1A]

$$Si(OR^1)_4 \quad (1A)$$

In the formula (1A), $R^1$ is each independently the same $R^1$ as $R^1$ in the formula (1). $R^1$ is each independently preferably an alkyl group having 1 to 10 carbon atoms, more preferably 1 to 5 carbon atoms, from the viewpoint of further improving the initial charge-discharge efficiency and cycle characteristics of the negative electrode active material.

Specific examples of a compound (1A) represented by such a general formula are shown in table below.

TABLE 1A

| Specific examples of compound (1A) | | | | |
|---|---|---|---|---|
| Compound | $R^1$ | $R^1$ | $R^1$ | $R^1$ |
| 1A-1 | Ethyl group | Ethyl group | Ethyl group | Ethyl group |
| 1A-2 | Methyl group | Methyl group | Methyl group | Methyl group |
| 1A-3 | Butyl group | Butyl group | Butyl group | Butyl group |
| 1A-4 | Isopropyl group | Isopropyl group | Isopropyl group | Isopropyl group |

[Chemical Formula 1B1]

$$Ti(OR^1)_4 \quad (1B)$$

In the formula (1B), $R^1$ is each independently the same $R_1$ as $R^1$ in the formula (1). From the viewpoint of further improving the initial charge-discharge efficiency and cycle characteristics of the negative electrode active material, $R^1$ is each independently preferably an alkyl group having 1 to 10 carbon atoms or a group represented by the general formula: —C($R^2$)═CH—CO—$R^3$ (wherein $R^2$ and $R^3$ are the same as $R^2$ and $R^3$ described in the general formula (1), respectively), and more preferably an alkyl group having 1 to 10 (particularly 1 to 5) carbon atoms.

In the formula (1B), $R^2$ and $R^3$ are preferably the following groups, respectively, from the viewpoint of further improving the initial charge-discharge efficiency and the cycle characteristics of the negative electrode active material. $R^2$ is an alkyl group having 1 to 10 carbon atoms, and preferably an alkyl group having 1 to 5 carbon atoms. Examples of the alkyl group as $R^2$ include the same alkyl group as the alkyl group as $R^1$. $R^3$ is an alkyl group having 1 to 30 carbon atoms, and preferably an alkyl group having 1 to 20 (more preferably 1 to 10, still more preferably 1 to 5) carbon atoms. Preferable examples of the alkyl group as $R^3$ include an alkyl group similar to the alkyl group as $R^1$, and an undecyl group, a lauryl group, a tridecyl group, a myristyl group, a pentadecyl group, a cetyl group, a heptadecyl group, a stearyl group, a nonadecyl group, and an eicosyl group.

Specific examples of a compound (1B) represented by such a general formula are shown in table below.

TABLE 1B1

| Specific examples of compound (1B) | | | | |
|---|---|---|---|---|
| Compound | $R^1$ | $R^1$ | $R^1$ | $R^1$ |
| 1B-1 | Butyl group | Butyl group | Butyl group | Butyl group |
| 1B-2 | Isopropyl group | Isopropyl group | Isopropyl group | Isopropyl group |
| 1B-3 | Ethyl group | Ethyl group | Ethyl group | Ethyl group |
| 1B-4 | Methyl group | Methyl group | Methyl group | Methyl group |
| 1B-5 | Isopropyl group | Isopropyl group | —$C(CH_3)$═CH—CO—$CH_3$ | —$C(CH_3)$═CH—CO—$CH_3$ |
| 1B-6 | Isopropyl group | Isopropyl group | —$C(CH_3)$═CH—CO—$C_2H_5$ | —$C(CH_3)$═CH—CO—$C_2H_5$ |
| 1B-7 | Butyl group | Butyl group | —$C(CH_3)$═CH—CO—$CH_3$ | —$C(CH_3)$═CH—CO—$CH_3$ |
| 1B-8 | Butyl group | Butyl group | —$C(CH_3)$═CH—CO—$C_2H_5$ | —$C(CH_3)$═CH—CO—$C_2H_5$ |
| 1B-9 | Ethyl group | Ethyl group | —$C(CH_3)$═CH—CO—$CH_3$ | —$C(CH_3)$═CH—CO—$CH_3$ |
| 1B-10 | Ethyl group | Ethyl group | —$C(CH_3)$═CH—CO—$C_2H_5$ | —$C(CH_3)$═CH—CO—$C_2H_5$ |
| 1B-11 | Methyl group | Methyl group | —$C(CH_3)$═CH—CO—$CH_3$ | —$C(CH_3)$═CH—CO—$CH_3$ |
| 1B-12 | Methyl group | Methyl group | —$C(CH_3)$═CH—CO—$C_2H_5$ | —$C(CH_3)$═CH—CO—$C_2H_5$ |

[Chemical Formula 1B2]

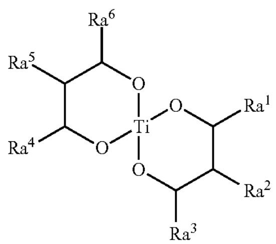

(1B')

In the formula (1B'), $Ra^1$, $Ra^2$, $Ra^3$, $Ra^4$, $Ra^5$, and $Ra^6$ each independently represent a hydrogen atom or an alkyl group having 1 to 10 carbon atoms, and from the viewpoint of further improving the initial charge-discharge efficiency and the cycle characteristics of the negative electrode active material, $Ra^1$, $Ra^2$, $Ra^3$, $Ra^4$, $Ra^5$, and $Ra^6$ each preferably represent an alkyl group having 1 to 5 carbon atoms. Alkyl groups as $Ra^1$, $Ra^2$, $Ra^3$, $Ra^4$, $Ra^5$, and $Ra^6$ are the same alkyl groups as $R^1$.

Specific examples of a compound (1B') represented by such a general formula are shown in table below.

TABLE 1B2

| Specific examples of compound (1B') | | | | | | |
|---|---|---|---|---|---|---|
| Compound | $Ra^1$ | $Ra^2$ | $Ra^3$ | $Ra^4$ | $Ra^5$ | $Ra^6$ |
| 1B'-1 | n-propyl group | Ethyl group | Hydrogen atom | n-propyl group | Ethyl group | Hydrogen atom |

[Chemical Formula 1C]

$$Al(OR^1)_3 \quad (1C)$$

In the formula (1C), $R^1$ is each independently the same $R^1$ as $R^1$ in the formula (1). From the viewpoint of further improving the initial charge-discharge efficiency and cycle characteristics of the negative electrode active material, $R^1$ is each independently preferably an alkyl group having 1 to 10 carbon atoms or a group represented by the general formula: —$C(R^2)$═CH—CO—$R^3$ (wherein $R^2$ and $R^3$ are the same as $R^2$ and $R^3$ described in the general formula (1), respectively), and more preferably an alkyl group having 1 to 10 (particularly 1 to 5) carbon atoms.

In the formula (1C), $R^2$ and $R^3$ are preferably the following groups, respectively, from the viewpoint of further improving the initial charge-discharge efficiency and the cycle characteristics of the negative electrode active material. $R^2$ is an alkyl group having 1 to 10 carbon atoms, and preferably an alkyl group having 1 to 5 carbon atoms. Examples of the alkyl group as $R^2$ include the same alkyl group as the alkyl group as $R^1$. $R^3$ is an alkyloxy group having 1 to 30 carbon atoms or an alkenyloxy group having 1 to 30 carbon atoms, and is preferably an alkyloxy group having 10 to 30 (particularly 14 to 24) carbon atoms or an alkenyloxy group having 10 to 30 (particularly 14 to 24) carbon atoms. Examples of the alkyloxy group as $R^3$ include a group represented by the formula: —O—$C_pH_{2p+1}$ (wherein p is an integer of 1 to 30). Examples of the alkyloxy group as $R^3$ include a group represented by the formula: —O—$C_qH_{2q-1}$ (wherein q is an integer of 1 to 30).

Specific examples of a compound (1C) represented by such a general formula are shown in table below.

TABLE 1C

| Specific examples of compound (1C) | | | |
|---|---|---|---|
| Compound | $R^1$ | $R^1$ | $R^1$ |
| 1C-1 | Isopropyl group | Isopropyl group | Isopropyl group |
| 1C-2 | Sec-butyl group | Sec-butyl group | Sec-butyl group |
| 1C-3 | Ethyl group | Ethyl group | Ethyl group |
| 1C-4 | Methyl group | Methyl group | Methyl group |
| 1C-5 | Isopropyl group | Isopropyl group | —$C(CH_3)$═CH—CO—$C_{18}H_{35}$ |
| 1C-6 | Isopropyl group | Isopropyl group | —$C(CH_3)$═CH—CO—$C_{18}H_{37}$ |
| 1C-7 | Sec-butyl group | Sec-butyl group | —$C(CH_3)$═CH—CO—$C_{18}H_{35}$ |
| 1C-8 | Sec-butyl group | Sec-butyl group | —$C(CH_3)$═CH—CO—$C_{18}H_{37}$ |
| 1C-9 | Ethyl group | Ethyl group | —$C(CH_3)$═CH—CO—$C_{18}H_{35}$ |
| 1C-10 | Ethyl group | Ethyl group | —$C(CH_3)$═CH—CO—$C_{18}H_{37}$ |

TABLE 1C-continued

| Specific examples of compound (1C) | | | |
|---|---|---|---|
| Compound | $R^1$ | $R^1$ | $R^1$ |
| 1C-11 | Methyl group | Methyl group | $—C(CH_3)═CH—CO—C_{18}H_{35}$ |
| 1C-12 | Methyl group | Methyl group | $—C(CH_3)═CH—CO—C_{18}H_{37}$ |

[Chemical Formula 1D]

$$Zr(OR^1)_4 \quad (1D)$$

In the formula (1D), $R^1$ is each independently the same $R^1$ as $R^1$ in the formula (1). $R^1$ is each independently preferably an alkyl group having 1 to 10 carbon atoms, more preferably 1 to 5 carbon atoms, from the viewpoint of further improving the initial charge-discharge efficiency and cycle characteristics of the negative electrode active material.

Specific examples of a compound (1D) represented by such a general formula are shown in table below.

TABLE 1D

| Specific examples of compound (1D) | | | | |
|---|---|---|---|---|
| Compound | $R^1$ | $R^1$ | $R^1$ | $R^1$ |
| 1D-1 | Isopropyl group | Isopropyl group | Isopropyl group | Isopropyl group |
| 1D-2 | Butyl group | Butyl group | Butyl group | Butyl group |
| 1D-3 | Ethyl group | Ethyl group | Ethyl group | Ethyl group |
| 1D-4 | Methyl group | Methyl group | Methyl group | Methyl group |

A compound (1) represented by the general formula (1) can be obtained as a commercially available product, or can be produced by a known method.

For example, a compound (1A) can be obtained as commercially available tetraethyl orthosilicate (manufactured by Tokyo Chemical Industry Co., Ltd.).

In addition, for example, a compound (1B) can be obtained as commercially available tetrabutyl orthotitanate (manufactured by Tokyo Chemical Industry Co., Ltd.) and T-50 (manufactured by Nippon Soda Co., Ltd.).

In addition, for example, a compound (1B') can be obtained as commercially available TOG (manufactured by Nippon Soda Co., Ltd.).

In addition, for example, a compound (1C) can be obtained as commercially available aluminum triisopropoxide (manufactured by KANTO CHEMICAL CO., INC.).

In addition, for example, a compound (1D) can be obtained as commercially available zirconium (IV) tetrabutoxide, trade name TBZR (manufactured by Nippon Soda Co., Ltd.) or ZR-181 (manufactured by Nippon Soda Co., Ltd.).

The content of the first metal alkoxide in the film 2 (that is, the reactant constituting the film) is typically 10% by mass or more and 95% by mass or less with respect to the total amount thereof (for example, the total amount of the first metal alkoxide and the second metal alkoxide), and from the viewpoint of further improving the initial charge-discharge efficiency of the negative electrode active material and the cycle characteristics, the content is preferably 20% by mass or more and 80% by mass or less, and more preferably 25% by mass or more and 75% by mass or less. The film may include two or more of the first metal alkoxides, and in this case, the total amount thereof may be within the above range.

The second metal alkoxide is a metal alkoxide including two or more of (for example, 2 or more and 20 or less, preferably 2 or more and 10 or less, more preferably 2 or more and 5 or less) metal atom-carbon atom bonds in one molecule. In the second metal alkoxide, the carbon atom constituting two or more of metal atom-carbon atom bonds is a carbon atom constituting a monovalent hydrocarbon group (for example, an alkyl group and an alkenyl group) and/or a carbon atom constituting a divalent hydrocarbon group (for example, an alkylene group). In the second metal alkoxide, the carbon atom constituting all of two or more of metal atom-carbon atom bonds is preferably a carbon atom constituting a divalent hydrocarbon group (for example, an alkylene group) from the viewpoint of further improving the initial charge-discharge efficiency and cycle characteristics of the negative electrode active material. The metal atom of the second metal alkoxide is silicon. The second metal alkoxide includes two or more of such metal atom-carbon atom bonds in one molecule. Therefore, physical deterioration of the film is suppressed. Specifically, for example, in the second metal alkoxide, when the carbon atom constituting the metal atom-carbon atom bond is a carbon atom constituting a divalent hydrocarbon group (for example, an alkylene group), the presence of the divalent hydrocarbon group causes the film to stretch and thus follow the core material during expansion of the core material. In addition, for example, in the second metal alkoxide, when the carbon atom constituting the metal atom-carbon atom bond is a carbon atom constituting a monovalent hydrocarbon group (for example, an alkyl group and an alkenyl group), the film follows the core material while the monovalent hydrocarbon group exhibits a stress change relaxing action (for example, cushioning action) during contraction of the core material. It is considered that these results can sufficiently suppress physical deterioration of the film 2, and can provide sufficiently excellent initial charge-discharge efficiency and cycle characteristics.

When the carbon atom constituting the metal atom-carbon atom bond in the second metal alkoxide is a carbon atom constituting a divalent hydrocarbon group, the second metal alkoxide is a compound having, in one molecule, two or more trialkoxysilyl groups represented by the following general formula (2):

[Chemical Formula 2]

$$—Si(OR^{21})_3 \quad (2)$$

wherein, $R^{21}$ each independently represent an alkyl group having 1 to 10 carbon atoms, preferably an alkyl group having 1 to 5 carbon atoms, and more preferably an alkyl group having 1 to 3 carbon atoms, from the viewpoint of further improving the initial charge-discharge efficiency and cycle characteristics of the negative electrode active material. Examples of such an alkyl group include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. For a plurality of $R^{21}$s, all of $R^{21}$s may each independently be selected from the above alkyl groups, or all of $R^{21}$s may be mutually the same group selected from the above alkyl groups.

The trialkoxysilyl groups of the second metal alkoxide may be each independently selected from the trialkoxysilyl groups of the general formula (2), or may be mutually the same group.

Specific examples of the trialkoxysilyl group represented by the general formula (2) are shown in table below.

TABLE 2

| Specific examples of group of general formula (2) | | | |
|---|---|---|---|
| Group | $R^{21}$ | $R^{21}$ | $R^{21}$ |
| 2A-1 | Methyl group | Methyl group | Methyl group |
| 2A-2 | Ethyl group | Ethyl group | Ethyl group |
| 2A-3 | Isopropyl group | Isopropyl group | Isopropyl group |
| 2A-4 | Butyl group | Butyl group | Butyl group |

When all carbon atoms constituting two or more of metal atom-carbon atom bonds in the second metal alkoxide are carbon atoms constituting a divalent hydrocarbon group, the second metal alkoxide may be, for example, a compound represented by the following general formula (2A), (2B), (2C), (2E), or (2F) or a mixture thereof. Of these, the second metal alkoxide is preferably a compound represented by the general formula (2A), (2E), or (2F) or a mixture thereof, and more preferably a compound represented by the general formula (2A), from the viewpoint of further improving the initial charge-discharge efficiency and cycle characteristics of the negative electrode active material.

When all carbon atoms constituting two or more of metal atom-carbon atom bonds in the second metal alkoxide are carbon atoms constituting a monovalent hydrocarbon group, the second metal alkoxide may be, for example, a compound represented by the following general formula (2D) or a mixture thereof.

[Chemical Formula 2A]

$$(R^{211}O)_3Si—R^{31}—Si(OR^{212})_3 \quad (2A)$$

In the formula (2A), $R^{211}$ and $R^{212}$ are each independently the same group as $R^{21}$ in the formula (2). Specifically, three $R^{211}$s and three $R^{212}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Three $R^{211}$s and three $R^{212}$s may be each independently selected from $R^{21}$ of the general formula (2), or may be mutually the same groups.

$R^{31}$ is a divalent hydrocarbon group having 1 to 20 carbon atoms, and from the viewpoint of further improving the initial charge-discharge efficiency and cycle characteristics of the negative electrode active material, preferably a divalent hydrocarbon group having 1 to 10 carbon atoms, more preferably a divalent hydrocarbon group having 1 to 8 carbon atoms, and still more preferably a divalent hydrocarbon group having 1 to 5 (particularly 1 to 3) carbon atoms. The divalent hydrocarbon group as $R^{31}$ may be a divalent saturated aliphatic hydrocarbon group (for example, an alkylene group) or a divalent unsaturated aliphatic hydrocarbon group (for example, an alkenylene group). The divalent hydrocarbon group as $R^{31}$ is preferably a divalent saturated aliphatic hydrocarbon group (particularly an alkylene group) from the viewpoint of further improving the initial charge-discharge efficiency and cycle characteristics of the negative electrode active material. Examples of the divalent saturated aliphatic hydrocarbon group (particularly, an alkylene group) as $R^{31}$ include a group represented by $—(CH_2)_p—$ (wherein p is an integer of 1 to 20, preferably 1 to 10, more preferably 1 to 8, still more preferably 1 to 5 (particularly 1 to 3)).

Specific examples of a compound (2A) represented by such a general formula are shown in table below.

TABLE 2A

| Specific examples of compound (2A) | | | | | | | |
|---|---|---|---|---|---|---|---|
| Compound | $R^{211}$ | $R^{211}$ | $R^{211}$ | $R^{31}$ | $R^{212}$ | $R^{212}$ | $R^{212}$ |
| 2A-1 | Methyl group | Methyl group | Methyl group | $—CH_2CH_2—$ | Methyl group | Methyl group | Methyl group |
| 2A-2 | Methyl group | Methyl group | Methyl group | $—CH_2CH_2CH_2CH_2CH_2CH_2—$ | Methyl group | Methyl group | Methyl group |
| 2A-3 | Ethyl group | Ethyl group | Ethyl group | $—CH_2CH_2—$ | Ethyl group | Ethyl group | Ethyl group |
| 2A-4 | Ethyl group | Ethyl group | Ethyl group | $—CH_2CH_2CH_2CH_2CH_2CH_2—$ | Ethyl group | Ethyl group | Ethyl group |

[Chemical Formula 2B]

(2B)

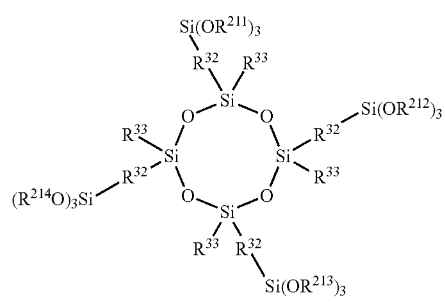

In the formula (2B), $R^{211}$, $R^{212}$, $R^{213}$, and $R^{214}$ are the same groups as $R^{21}$ in the formula (2). Specifically, three $R^{211}$s, three $R^{212}$s, three $R^{213}$ s, and three $R^{214}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Three $R^{211}$s, three $R^{212}$s, three $R^{213}$s, and three $R^{214}$s may be each independently selected from $R^{21}$ of the general formula (2), or may be mutually the same groups.

$R^{32}$ is each independently a divalent hydrocarbon group having 1 to 20 carbon atoms, and from the viewpoint of further improving the initial charge-discharge efficiency and cycle characteristics of the negative electrode active material, preferably a divalent hydrocarbon group having 1 to 10 carbon atoms, and more preferably a divalent hydrocarbon group having 6 to 10 carbon atoms. The divalent hydrocarbon group as $R^{32}$ may be a divalent saturated aliphatic hydrocarbon group (for example, an alkylene group) or a divalent unsaturated aliphatic hydrocarbon group (for example, an alkenylene group). The divalent hydrocarbon group as $R^{32}$ is preferably a divalent saturated aliphatic hydrocarbon group (particularly an alkylene group) from the viewpoint of further improving the initial charge-discharge efficiency and cycle characteristics of the negative electrode active material. Examples of the divalent saturated aliphatic hydrocarbon group (particularly, an alkylene group) as $R^{32}$ include a group represented by —$(CH_2)_q$— (wherein q is an integer of 1 to 10, more preferably 6 to 10). All of $R^{32}$s may be each independently selected from the $R^{32}$, or may be mutually the same group.

$R^{33}$ is each independently a monovalent hydrocarbon group having 1 to 10 carbon atoms, and from the viewpoint of further improving the initial charge-discharge efficiency and cycle characteristics of the negative electrode active material, preferably a monovalent hydrocarbon group having 1 to 5 carbon atoms, and more preferably a monovalent hydrocarbon group having 1 to 3 carbon atoms. The monovalent hydrocarbon group as $R^{33}$ may be a saturated aliphatic hydrocarbon group (for example, an alkyl group) or an unsaturated aliphatic hydrocarbon group (for example, an alkenyl group). The monovalent hydrocarbon group as $R^{33}$ is preferably a saturated aliphatic hydrocarbon group (particularly an alkyl group) from the viewpoint of further improving the initial charge-discharge efficiency and cycle characteristics of the negative electrode active material. Examples of the monovalent saturated aliphatic hydrocarbon group (particularly, alkyl group) as $R^{33}$ include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. All of $R^{33}$s may be each independently selected from the $R^{33}$, or may be mutually the same group.

Specific examples of a compound (2B) represented by such a general formula are shown in table below.

TABLE 2B

| Specific examples of compound (2B) | | | |
|---|---|---|---|
| Compound | Three $R^{211}$s, three $R^{212}$s, three $R^{213}$s, three $R^{214}$s | Four $R^{32}$s | Four $R^{33}$s |
| 2B-1 | Methyl group | —$CH_2CH_2CH_2CH_2CH_2CH_2CH_2CH_2$— | Methyl group |
| 2B-2 | Ethyl group | —$CH_2CH_2CH_2CH_2CH_2CH_2CH_2CH_2$— | Methyl group |

[Chemical Formula 2C]

$$(R^{211}O)_3Si—R^{34}—NH—R^{35}—NH—R^{36}—Si(OR^{212})_3 \quad (2C)$$

In the formula (2C), $R^{211}$ and $R^{212}$ are the same groups as $R^{21}$ in the formula (2). Specifically, three $R^{211}$s and three $R^{212}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Three $R^{211}$s and three $R^{212}$s may be each independently selected from $R^{21}$ of the general formula (2), or may be mutually the same groups.

$R^{34}$, $R^{35}$, and $R^{36}$ are each independently a divalent hydrocarbon group having 1 to 10 carbon atoms, and are preferably a divalent hydrocarbon group having 1 to 5 carbon atoms from the viewpoint of further improving the initial charge-discharge efficiency and cycle characteristics of the negative electrode active material. The divalent hydrocarbon group as $R^{34}$, $R^{35}$, and $R^{36}$ may be a divalent saturated aliphatic hydrocarbon group (for example, an alkylene group), or may be a divalent unsaturated aliphatic hydrocarbon group (for example, an alkenylene group). The divalent hydrocarbon group as $R^{34}$, $R^{35}$, and $R^{36}$ is preferably a divalent saturated aliphatic hydrocarbon group (particularly, an alkylene group) from the viewpoint of further improving the initial charge-discharge efficiency and cycle characteristics of the negative electrode active material. Examples of the divalent saturated aliphatic hydrocarbon group (particularly, an alkylene group) as $R^{34}$, $R^{35}$, and $R^{36}$ include a group represented by —$(CH_2)_r$— (wherein r is an integer of 1 to 10, more preferably 1 to 5). All of $R^{34}$, $R^{35}$, and $R^{36}$ may be each independently selected from the divalent hydrocarbon group, or may be mutually the same group. The total number of carbon atoms of $R^{34}$, $R^{35}$, and $R^{36}$ is preferably 3 to 20, and more preferably 6 to 10, from the viewpoint of further improving the initial charge-discharge efficiency and cycle characteristics of the negative electrode active material.

Specific examples of a compound (2C) represented by such a general formula are shown in table below.

TABLE 2C

| Specific examples of compound (2C) | | | | |
|---|---|---|---|---|
| Compound | Three $R^{211}$s, three $R^{212}$s | $R^{34}$ | $R^{35}$ | $R^{36}$ |
| 2C-1 | Methyl group | —$CH_2CH_2CH_2$— | —$CH_2CH_2$— | —$CH_2CH_2CH_2$— |
| 2C-2 | Ethyl group | —$CH_2CH_2CH_2$— | —$CH_2CH_2$— | —$CH_2CH_2CH_2$— |

[Chemical Formula 2D]

$$(R^{211})_2\text{—}Si(OR^{212})_2 \quad (2D)$$

In the formula (2D), $R^{211}$ and $R^{212}$ are each independently the same group as $R^{21}$ in the formula (2). Specifically, two $R^{211}$s and two $R^{212}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Two $R^{211}$s and two $R^{212}$s may be each independently selected from $R^{21}$ of the general formula (2), or may be mutually the same groups.

Specific examples of a compound (2D) represented by such a general formula are shown in table below.

TABLE 2D

| Specific examples of compound (2D) | | |
|---|---|---|
| Compound | Two $R^{211}$s | two $R^{212}$s |
| 2D-1 | Methyl group | Methyl group |
| 2D-2 | Methyl group | Ethyl group |

[Chemical Formula 2E]

(2E)

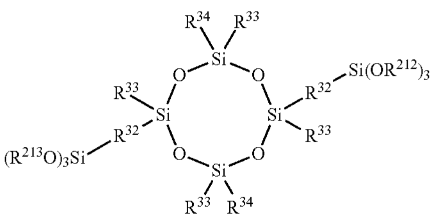

In the formula (2E), $R^{212}$ and $R^{213}$ are the same groups as $R^{21}$ in the formula (2). Specifically, three $R^{212}$s and three $R^{213}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Three $R^{212}$s and three $R^{213}$s may be each independently selected from $R^{21}$ of the general formula (2), or may be mutually the same groups.

$R^{32}$ is each independently a divalent hydrocarbon group having 1 to 20 carbon atoms, and from the viewpoint of further improving the initial charge-discharge efficiency and cycle characteristics of the negative electrode active material, preferably a divalent hydrocarbon group having 1 to 10 carbon atoms, and more preferably a divalent hydrocarbon group having 4 to 8 carbon atoms. The divalent hydrocarbon group as $R^{32}$ may be a divalent saturated aliphatic hydrocarbon group (for example, an alkylene group) or a divalent unsaturated aliphatic hydrocarbon group (for example, an alkenylene group). The divalent hydrocarbon group as $R^{32}$ is preferably a divalent saturated aliphatic hydrocarbon group (particularly an alkylene group) from the viewpoint of further improving the initial charge-discharge efficiency and cycle characteristics of the negative electrode active material. Examples of the divalent saturated aliphatic hydrocarbon group (particularly, an alkylene group) as $R^{32}$ include a group represented by —$(CH_2)_q$— (wherein q is an integer of 1 to 20, preferably 1 to 10, and more preferably 4 to 8). All of $R^{32}$s may be each independently selected from the $R^{32}$, or may be mutually the same group.

$R^{33}$ is each independently a monovalent hydrocarbon group having 1 to 10 carbon atoms, and from the viewpoint of further improving the initial charge-discharge efficiency and cycle characteristics of the negative electrode active material, preferably a monovalent hydrocarbon group having 1 to 5 carbon atoms, and more preferably a monovalent hydrocarbon group having 1 to 3 carbon atoms. The monovalent hydrocarbon group as $R^{33}$ may be a saturated aliphatic hydrocarbon group (for example, an alkyl group) or an unsaturated aliphatic hydrocarbon group (for example, an alkenyl group). The monovalent hydrocarbon group as $R^{33}$ is preferably a saturated aliphatic hydrocarbon group (particularly an alkyl group) from the viewpoint of further improving the initial charge-discharge efficiency and cycle characteristics of the negative electrode active material. Examples of the monovalent saturated aliphatic hydrocarbon group (particularly, alkyl group) as $R^{33}$ include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. All of $R^{33}$s may be each independently selected from the $R^{33}$, or may be mutually the same group.

$R^{34}$ is each independently a monovalent hydrocarbon group having 1 to 30 carbon atoms, and from the viewpoint of further improving the initial charge-discharge efficiency and cycle characteristics of the negative electrode active material, preferably a monovalent hydrocarbon group having 1 to 10 carbon atoms, and more preferably a monovalent hydrocarbon group having 1 to 5 carbon atoms. The monovalent hydrocarbon group as $R^{34}$ may be a saturated aliphatic hydrocarbon group (for example, an alkyl group) or an unsaturated aliphatic hydrocarbon group (for example, an alkenyl group). The monovalent hydrocarbon group as $R^{34}$ is preferably a saturated aliphatic hydrocarbon group (particularly an alkyl group) from the viewpoint of further improving the initial charge-discharge efficiency and cycle characteristics of the negative electrode active material. Examples of the monovalent saturated aliphatic hydrocarbon group (particularly, alkyl group) as $R^{34}$ include a methyl group, an ethyl group, a n-propyl group, an isopropyl group, a n-butyl group, an isobutyl group, a sec-butyl group, a tert-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. All of $R^{34}$s may be each independently selected from the $R^{34}$, or may be mutually the same group.

Specific examples of a compound (2E) represented by such a general formula are shown in table below.

TABLE 2E

| Specific examples of compound (2E) | | | | |
|---|---|---|---|---|
| Compound | Three $R^{212}$s, three $R^{213}$s | Two $R^{32}$s | Four $R^{33}$s | Two $R^{34}$s |
| 2E-1 | Methyl group | —$CH_2CH_2CH_2CH_2CH_2CH_2$— | Methyl group | Ethyl group |
| 2E-2 | Ethyl group | —$CH_2CH_2CH_2CH_2CH_2CH_2$— | Methyl group | Ethyl group |

[Chemical Formula 2F]

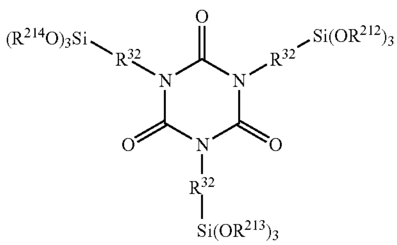

(2F)

In the formula (2F), $R^{212}$, $R^{213}$, and $R^{214}$ are each independently the same group as $R^{21}$ in the formula (2). Specifically, three $R^{212}$s, three $R^{213}$s, and three $R^{214}$s are each independently an alkyl group having 1 to 10 carbon atoms, and from the viewpoint of further improving the initial charge-discharge efficiency and cycle characteristics of the negative electrode active material, preferably an alkyl group having 1 to 5 carbon atoms, and more preferably an alkyl group having 1 to 3 carbon atoms. Three $R^{212}$s, three $R^{213}$s, and three $R^{214}$s may be each independently selected from $R^{21}$ of the general formula (2), or may be mutually the same groups.

$R^{32}$ is each independently a divalent hydrocarbon group having 1 to 20 carbon atoms, and from the viewpoint of further improving the initial charge-discharge efficiency and cycle characteristics of the negative electrode active material, preferably a divalent hydrocarbon group having 1 to 10 carbon atoms, and more preferably a divalent hydrocarbon group having 1 to 5 carbon atoms. The divalent hydrocarbon group as $R^{32}$ may be a divalent saturated aliphatic hydrocarbon group (for example, an alkylene group) or a divalent unsaturated aliphatic hydrocarbon group (for example, an alkenylene group). The divalent hydrocarbon group as $R^{32}$ is preferably a divalent saturated aliphatic hydrocarbon group (particularly an alkylene group) from the viewpoint of further improving the initial charge-discharge efficiency and cycle characteristics of the negative electrode active material. Examples of the divalent saturated aliphatic hydrocarbon group (particularly, an alkylene group) as $R^{32}$ include a group represented by —$(CH_2)_q$— (wherein q is an integer of 1 to 10, more preferably 1 to 5). All of $R^{32}$s may be each independently selected from the $R^{32}$, or may be mutually the same group.

Specific examples of a compound (2F) represented by such a general formula are shown in table below.

TABLE 2F

| Specific examples of compound (2F) | | | | |
|---|---|---|---|---|
| Compound | Three $R^{212}$s | Three $R^{213}$s | Three $R^{214}$s | Three $R^{32}$s |
| 2F-1 | Methyl group | Methyl group | Methyl group | —$CH_2CH_2CH_2$— |
| 2F-2 | Ethyl group | Ethyl group | Ethyl group | —$CH_2CH_2CH_2$— |

The compound (2A) represented by the general formula (2A), the compound (2B) represented by the general formula (2B), the compound (2C) represented by the general formula (2C), the compound (2D) represented by the general formula (2D), the compound (2E) represented by the general formula (2E), and the compound (2F) represented by the general formula (2F) can be obtained as commercially available products, or can be produced by a known method.

For example, the compound (2A) can be obtained as commercially available products, 1,2-bis(trimethoxysilyl) ethane (manufactured by Tokyo Chemical Industry Co., Ltd.) and 1,6-bis(trimethoxysilyl)hexane (manufactured by Tokyo Chemical Industry Co., Ltd.).

In addition, for example, the compound (2C) can be obtained as a commercially available product, X-12-5263HP (manufactured by Shin-Etsu Chemical Co., Ltd.).

In addition, for example, the compound (2D) can be obtained as a commercially available product, dimethyldimethoxysilane (manufactured by Tokyo Chemical Industry Co., Ltd.).

In addition, for example, the compound (2F) can be obtained as a commercially available product, tris[3-(trimethoxysilyl)-propyl]isocyanurate (manufactured by Tokyo Chemical Industry Co., Ltd.).

The second metal alkoxide may be, for example, a compound represented by general formula (2A), (2B), (2C), (2D), (2E), or (2F), or a mixture thereof. From the viewpoint of further improving the initial charge-discharge efficiency and cycle characteristics of the negative electrode active material, the second metal alkoxide is preferably a compound represented by general formula (2A), (2D), (2E), or (2F) or a mixture thereof, and more preferably a compound represented by the general formula (2A) (particularly, $R^{31}$ is a divalent hydrocarbon group having 1 to 5 (preferably 1 to 3) carbon atoms; $R^{211}$ and $R^{212}$ are the same as $R^{211}$ and $R^{212}$ in the general formula (2A), respectively) or a compound represented by (2D), or a mixture thereof.

The content of the second metal alkoxide in the film 2 (that is, the reactant constituting the film) is typically 5% by mass or more and 90% by mass or less with respect to the total amount thereof (for example, the total amount of the first metal alkoxide and the second metal alkoxide), and from the viewpoint of further improving the initial charge-discharge efficiency of the negative electrode active material and the cycle characteristics, the content is preferably 20% by mass or more and 80% by mass or less, and more preferably 25% by mass or more and 75% by mass or less. The film may include two or more of the second metal alkoxides, and in this case, the total amount thereof may be within the above range.

The content (that is, the coating amount) of the film 2 in the negative electrode active material 10 is typically 0.20% by mass or more and 4.00% by mass or less with respect to the total amount (that is, the total amount of the negative electrode active material core material and the film) of the negative electrode active material 10, and from the viewpoint of further improving the initial charge-discharge efficiency of the negative electrode active material and the cycle characteristics, preferably 0.30% by mass or more and 3.20% by mass or less, and more preferably 0.30% by mass or more and 1.000% by mass or less. In the calculation of the content, calculation was performed on the assumption that a total amount of alkoxide included in the metal alkoxide undergoes dehydration condensation reaction to provide a reaction product having no other structure change. For example, the mass of the reaction product obtained by the dehydration condensation reaction of a total amount of alkoxide included in 1 g of 1,2-bis(trimethoxysilyl)ethane is 0.49 g.

The negative electrode active material of the present disclosure can be produced by a method including stirring a negative electrode active material core material together with a first metal alkoxide and a second metal alkoxide in an alkaline solvent. After the stirring, specifically, the negative electrode active material core material is separated by filtration, washed, and dried by heating to provide a negative electrode active material that has included a film formed on the surface of the negative electrode active material core material. The coating method is not limited to the above method as long as coating can be performed on the active material core material, and may be performed by an application method such as spraying or dry mixing.

The blending ratio (that is, the ratio of amount used) of the first metal alkoxide and the second metal alkoxide is typically the content ratio of each metal alkoxide in the film as it is, and thus may be a blending ratio according to a desired content ratio.

The blending amount of the first metal alkoxide is typically 0.1 parts by mass or more and 20 parts by mass or less with respect to 100 parts by mass of the negative electrode active material core material, and from the viewpoint of further improving the initial charge-discharge efficiency and the cycle characteristics of the negative electrode active material, preferably 0.1 parts by mass or more and 10 parts by mass or less, and more preferably 0.5 parts by mass or more and 2.0 parts by mass or less.

The blending amount of the second metal alkoxide is typically 0.1 parts by mass or more and 10 parts by mass or less with respect to 100 parts by mass of the negative electrode active material core material, and from the viewpoint of further improving the initial charge-discharge efficiency and the cycle characteristics of the negative electrode active material, preferably 0.1 parts by mass or more and 5 parts by mass or less, and more preferably 0.2 parts by mass or more and 1.8 parts by mass or less.

The total blending amount of the first metal alkoxide and the second metal alkoxide is not particularly limited as long as a film is formed on the surface of the negative electrode active material core material, and is, for example, 0.5 parts by mass or more and 20 parts by mass or less with respect to 100 parts by mass of the negative electrode active material core material, and is preferably 0.5 parts by mass or more and 10 parts by mass or less, more preferably 0.8 parts by mass or more and 3.0 parts by mass or less from the viewpoint of further improving the initial charge-discharge efficiency and the cycle characteristics of the negative electrode active material. Adjusting the total blending amount can control the content (that is, the coating amount) of the film 2 in the negative electrode active material 10 described above. The coating amount increases as the total blending amount increases.

The solvent is not particularly limited as long as it does not inhibit the reaction of each metal alkoxide of the first metal alkoxide and the second metal alkoxide, and for example, monoalcohols, ethers, glycols, or glycol ethers are preferable. In a preferable embodiment, the solvent can be monoalcohols such as methanol, ethanol, 1-propanol, 2-propanol, 1-butanol, 2-butanol, iso-butyl alcohol, 1-pentanol, 2-pentanol, and 2-methyl-2 pentanol; ethers such as 2-methoxyethanol, 2-ethoxyethanol, and 2-butoxyethanol; glycols such as ethylene glycol, diethylene glycol, triethylene glycol, and propylene glycol; and glycol ethers such as dipropylene glycol monomethyl ether, diethylene glycol monomethyl ether, diethylene glycol monoethyl ether, diethylene glycol monobutyl ether, triethylene glycol monomethyl ether, and diethylene glycol monohexyl ether. Preferable solvent is monoalcohols. In addition, water may be included as necessary. The above solvent may be used singly or in combination of two or more. The solvent may include various additives such as a catalyst, a pH adjusting agent, a stabilizer, and a thickener. Examples of the additive include an acid compound such as a boric acid compound and a base compound such as an ammonia compound. The blending amount of the solvent is not particularly limited as long as each metal alkoxide can be uniformly present on the surface of the negative electrode active material core material, and may be, for example, 20 parts by mass or more and 200 parts by mass or less, and particularly 30 parts by mass or more and 150 parts by mass or less with respect to 100 parts by mass of the negative electrode active material core material.

The temperature of the mixture during stirring is not particularly limited as long as each metal alkoxide can be uniformly present on the surface of the negative electrode active material core material, and is, for example, 10° C. or more and 70° C. or less, preferably 15° C. or more and 35° C. or less.

The stirring time is also not particularly limited as long as each metal alkoxide can be uniformly present on the surface of the negative electrode active material core material, and is, for example, 10 minutes or more and 5 hours or less, preferably 30 minutes or more and 3 hours or less.

Washing is performed to remove the remaining catalyst. For example, a filtration residue is brought into contact with a washing solvent. The washing solvent is not particularly limited, and may be, for example, acetone.

The solvent used in the washing is removed by heating and drying. The heating temperature is typically 15° C. or more (particularly, 15° C. or more and 250° C. or less), and is preferably 15° C. or more and 200° C. or less from the viewpoint of solvent removal. The heating time is typically 30 minutes or more (particularly, 30 minutes or more and 24 hours or less), and is preferably 60 minutes or more and 12 hours or less from the viewpoint of solvent removal.

The negative electrode of the present disclosure is composed of at least a negative electrode layer and a negative electrode current collector (foil), and the negative electrode layer includes the above coated negative electrode active material. The coated negative electrode active material of the negative electrode layer is composed of, for example, a granular material, and a binder is preferably included in the negative electrode layer for sufficient contact between particles and shape retention. The negative electrode layer preferably further includes a conductive auxiliary agent in order to facilitate the transfer of electrons for promoting the battery reaction. As described above, a plurality of components are contained, and therefore the negative electrode layer can also be referred to as a "negative electrode mixture layer".

The content of the negative electrode active material in the negative electrode layer is typically 50% by mass or more and 95% by mass or less with respect to the total amount of the negative electrode layer, and from the viewpoint of further improving the initial charge-discharge efficiency and cycle characteristics of the negative electrode active material, preferably 70% by mass or more and 95% by mass or less, and more preferably 85% by mass or more and 95% by mass or less.

The negative electrode layer may include a conventional negative electrode active material together with the coated negative electrode active material. When the negative electrode layer includes a conventional negative electrode active material together with the coated negative electrode active material, the content of the negative electrode active material is the content of all of the negative electrode active materials. The conventional negative electrode active material is, for example, a material that contributes to occlusion and release of lithium ions. From such a viewpoint, the conventional negative electrode active material is not particularly limited, and examples thereof include a silicon-based material, a carbon-based material, or a mixture thereof that can constitute the negative electrode active material core material of the coated negative electrode active material. The negative electrode layer preferably includes a carbon-based material (particularly, graphite, preferably artificial graphite) as a conventional negative electrode active material together with the coated negative electrode active material, from the viewpoint that the negative electrode layer more hardly expands and contracts during charge and discharge and the electrolytic solution is hardly decomposed while the secondary battery obtains a higher theoretical capacity (in other words, battery capacity). The mixing ratio of the coated negative electrode active material and the conventional negative electrode active material (particularly, carbon-based material) is typically 1/99 or more and 99/1 or less, and from the viewpoint of further improving the theoretical capacity (in other words, battery capacity) of the secondary battery, the expansion-and-contraction resistance of the negative electrode layer during charge and discharge, and the decomposition resistance of the electrolytic solution, preferably 10/90 or more and 50/50 or less, and more preferably 20/80 or more and 40/60 or less.

The binder that can be included in the negative electrode layer is not particularly limited, and examples thereof include at least one selected from the group consisting of styrene butadiene rubber, polyacrylic acid and a salt thereof, polyurethane, polyvinylidene fluoride, a polyimide-based resin, a polyaramide-based resin, and a polyamideimide-based resin. In a more preferable embodiment, the binder included in the negative electrode layer is polyvinylidene fluoride. The conductive auxiliary agent that can be included in the negative electrode layer is not particularly limited, and examples thereof include at least one selected from carbon black (including scaly carbon) such as thermal black, furnace black, channel black, ketjen black, and acetylene black, carbon fibers such as graphite, carbon nanotube, and vapor phase growth carbon fiber, metal powders such as copper, nickel, aluminum, and silver, and polyphenylene derivatives. The negative electrode layer may include a thickener component (for example, methyl cellulose) used in producing the battery.

The thickness of the negative electrode layer after drying, pressing, and vacuum drying is not particularly limited, and may be, for example, 1 μm or more and 300 μm or less, particularly 5 μm or more and 100 μm or less. The thickness of the negative electrode layer is the thickness inside the secondary battery, and an average value of measured values at optional 50 locations is used.

The negative electrode current collector is a member that contributes to collecting and supplying electrons generated in the active material due to the battery reaction. Such a current collector may be a sheet-shaped metal member and may have a porous or perforated form. For example, the current collector may be a metal foil, a punching metal, a net, or an expanded metal. The negative electrode current collector used for the negative electrode is preferably composed of a metal foil including at least one selected from the group consisting of copper, stainless steel, and nickel, and for example, a copper foil may be included.

In the negative electrode, the negative electrode layer may be provided on at least one surface of the negative electrode current collector. For example, in the negative electrode, the negative electrode layer may be provided on both surfaces of the negative electrode current collector, or the negative electrode layer may be provided on one surface of the negative electrode current collector. From the viewpoint of further increasing the capacity of a battery (particularly a secondary battery), in a preferable negative electrode, negative electrode layers are provided on both surfaces of a negative electrode current collector.

The negative electrode can be obtained, for example, by applying a negative electrode current collector with a negative electrode layer slurry prepared by mixing a negative electrode active material and a binder in a dispersion medium, drying the slurry, and then rolling a dried film with a roll press machine or the like.

Preferable embodiments regarding the method of producing the negative electrode are as follows.

A coated negative electrode active material (and a conventional negative electrode active material when desired), a binder, and a dispersion medium (particularly, a non-aqueous solvent) are mixed. Thereafter, the mixture may be stirred. The stirring method and stirring conditions are not particularly limited, and for example, a stirring apparatus such as a mixer may be used. The type of the non-aqueous solvent is not particularly limited as long as it is any one or two or more among materials not only capable of dispersing the coated negative electrode active material (and the conventional negative electrode active material to be mixed when desired) but also capable of dissolving the binder. This non-aqueous solvent is, for example, an organic solvent such as N-methyl-2-pyrrolidone. The binder is dissolved by such a non-aqueous solvent, thus preparing a non-aqueous dispersion including the coated negative electrode active material (and the conventional negative electrode active material to be mixed when desired) and the binder. The state of this non-aqueous dispersion is not particularly limited, and is, for example, a paste. The paste non-aqueous dispersion is a so-called slurry.

Then, a negative electrode is produced by using the non-aqueous dispersion. In this case, for example, the non-aqueous dispersion is applied onto both surfaces of the negative electrode current collector, and then the nonaqueous dispersion is dried. This forms a negative electrode layer including a coated negative electrode active material (and a conventional negative electrode active material when desired) and a binder, and thus the negative electrode is completed. Thereafter, the negative electrode layer may be compression-molded by using a roll press machine or the like. In this case, the negative electrode layer may be heated, or compression-molding may be repeated a plurality of times. The compression condition and the heating condition are not particularly limited.

The present disclosure provides a battery such as a secondary battery and a primary battery. In the present specification, the term "secondary battery" refers to a battery that can be repeatedly charged and discharged. The "secondary battery" is not excessively limited by its name, and can include, for example, a "power storage device". The term "primary battery" refers to a battery capable of only discharging. The battery of the present disclosure is preferably a secondary battery.

The secondary battery of the present disclosure includes the negative electrode described above. In the secondary battery of the present disclosure, in addition to the above negative electrode, a positive electrode, a separator disposed between the positive electrode and the negative electrode, and an electrolyte are typically enclosed in an exterior body.

In the secondary battery of the present disclosure, the positive electrode, the negative electrode, and the separator disposed between the positive electrode and the negative electrode constitute an electrode assembly. In the secondary battery of the present disclosure, the electrode assembly may have any structure as long as the above negative electrode (particularly, the above coated negative electrode active material) is included. This is because the effect of improving the initial charge-discharge efficiency and the cycle characteristics of the negative electrode active material can be obtained regardless of the structure of the electrode assembly. Examples of the structure that the electrode assembly can have include a laminated structure (planar laminated structure), a wound structure (jelly roll structure), and a stack-and-folding structure. Specifically, for example, the electrode assembly may have a planar laminated structure in which one or more positive electrodes and one or more negative electrodes are laminated in a planar shape with a separator interposed therebetween. In addition, for example, the electrode assembly may have a wound structure (jelly roll type) in which a positive electrode, a negative electrode, and a separator disposed between the positive electrode and the negative electrode are wound in a roll shape. In addition, for example, the electrode assembly may have a so-called stack-and-folding structure in which a positive electrode, a separator, and a negative electrode are laminated on a long film and then folded.

The positive electrode is composed of at least a positive electrode layer and a positive electrode current collector (foil), and the positive electrode layer may be provided on at least one surface of the positive electrode current collector. For example, in the positive electrode, the positive electrode layer may be provided on both surfaces of the positive electrode current collector, or the positive electrode layer may be provided on one surface of the positive electrode current collector. From the viewpoint of further increasing the capacity of the secondary battery, in a preferable positive electrode, positive electrode layers are provided on both surfaces of a positive electrode current collector.

The positive electrode layer includes a positive electrode active material. The negative electrode active material included in the negative electrode layer and the positive electrode active material included in the positive electrode layer are materials directly involved in the transfer of electrons in the secondary battery, and are main materials of the positive and negative electrodes serving charge and discharge, that is, a battery reaction. More specifically, ions are brought in an electrolyte due to "the positive electrode active material included in the positive electrode layer" and "the negative electrode active material included in the negative electrode layer", and such ions move between the positive electrode and the negative electrode to transfer electrons, and charge and discharge are thus performed. The positive electrode and the negative electrode are preferably electrodes capable of occluding and releasing lithium ions, that is, the positive electrode layer and the negative electrode layer are preferably layers capable of occluding and releasing lithium ions. That is, there is preferable a secondary battery in which lithium ions move between the positive electrode and the negative electrode via the electrolyte to charge and discharge the battery. When lithium ions are involved in charging and discharging, the secondary battery according to the present embodiment corresponds to a so-called "lithium ion battery".

The positive electrode active material of the positive electrode layer is composed of, for example, a granular body, and preferably includes a binder for sufficient contact between particles and shape retention, and a conductive auxiliary agent may be included in the positive electrode layer in order to facilitate transfer of electrons for promoting a battery reaction. As described above, a plurality of components are included, and therefore the positive electrode layer can also be referred to as a "positive electrode mixture layer".

The positive electrode active material is preferably a material that contributes to occlusion and release of lithium ions. From such a viewpoint, the positive electrode active material is preferably, for example, a lithium-containing composite oxide. More specifically, the positive electrode active material is preferably a lithium transition metal composite oxide including lithium and at least one transition metal selected from the group consisting of cobalt, nickel, manganese, and iron. That is, in the positive electrode layer of the secondary battery according to the present embodiment, such a lithium transition metal composite oxide is preferably included as a positive electrode active material. For example, the positive electrode active material may be lithium cobaltate, lithium nickelate, lithium manganate, lithium iron phosphate, or a material obtained by replacing a part of these transition metals with another metal. Such a positive electrode active material may be included as a single species, or two or more species may be included in combination. In a more preferable embodiment, the positive electrode active material included in the positive electrode layer is lithium cobalt oxide.

The binder that can be included in the positive electrode layer is not particularly limited, and examples thereof include at least one selected from the group consisting of polyvinylidene fluoride, a vinylidene fluoride-hexafluoropropylene copolymer, a vinylidene fluoride-tetrafluoroethylene copolymer, and polytetrafluoroethylene. In a more preferable embodiment, the binder of the positive electrode layer is polyvinylidene fluoride.

The content of the binder in the positive electrode layer is typically 0.1% by mass or more and 20% by mass or less with respect to the total amount of the positive electrode layer, and from the viewpoint of further improving the initial charge-discharge efficiency of the negative electrode active material and the cycle characteristics, preferably 0.1% by mass or more and 10% by mass or less, and more preferably 0.5% by mass or more and 8% by mass or less.

The conductive auxiliary agent that can be included in the positive electrode layer is not particularly limited, and examples thereof include at least one selected from carbon black such as thermal black, furnace black, channel black, ketjen black, and acetylene black, carbon fibers such as graphite, carbon nanotube, and vapor phase growth carbon fiber, metal powders such as copper, nickel, aluminum, and silver, and polyphenylene derivatives. In a more preferable embodiment, the conductive auxiliary agent of the positive electrode layer is carbon black (particularly, ketjen black).

In a more preferable embodiment, the binder and the conductive auxiliary agent of the positive electrode layer are a combination of polyvinylidene fluoride and carbon black (particularly, ketjen black).

The content of the conductive auxiliary agent in the positive electrode layer is typically 0.1% by mass or more and 20% by mass or less with respect to the total amount of the positive electrode layer, and from the viewpoint of further improving the initial charge-discharge efficiency of the negative electrode active material and the cycle characteristics, preferably 0.1% by mass or more and 10% by mass or less, and more preferably 0.5% by mass or more and 8% by mass or less.

The thickness (after drying) of the positive electrode layer is not particularly limited, and may be, for example, 1 μm or more and 300 μm or less, particularly 5 μm or more and 200 μm or less. The thickness of the positive electrode layer is the thickness inside the battery (particularly, the secondary battery), and an average value of measured values at optional 50 locations is used.

The positive electrode current collector is a member that contributes to collecting and supplying electrons generated in the active material due to the battery reaction. Such a current collector may be a sheet-shaped metal member and may have a porous or perforated form. For example, the current collector may be a metal foil, a punching metal, a net, or an expanded metal. The positive electrode current collector used for the positive electrode is preferably composed of a metal foil including at least one selected from the group consisting of aluminum, stainless steel, and nickel, and the metal foil may be, for example, an aluminum foil.

The positive electrode can be obtained, for example, by applying a positive electrode current collector with a positive electrode layer slurry prepared by mixing a positive electrode active material and a binder in a dispersion medium, drying the slurry, and then rolling a dried film with a roll press machine or the like.

The separator is a member provided from the viewpoint of preventing a short circuit due to contact between the positive and negative electrodes and holding the electrolyte. In other words, the separator is a member that allows ions to pass while preventing electronic contact between the positive electrode and the negative electrode. Preferably, the separator is a porous or microporous insulating member, and has a membrane form due to the small thickness thereof. For example merely, a microporous membrane composed of polyolefin may be used as the separator. In this regard, the microporous membrane used as the separator may include, for example, only polyethylene (PE) or only polypropylene (PP) as polyolefin. Furthermore, the separator may be a laminate composed of a "microporous membrane composed of PE" and a "microporous membrane composed of PP". The surface of the separator may be covered with an inorganic particle coating layer and/or an adhesive layer. The surface of the separator may have adhesiveness.

The thickness of the separator is not particularly limited, and may be, for example, 1 μm or more and 100 μm or less, particularly 5 μm or more and 30 μm or less. The thickness of the separator is the thickness inside the secondary battery (particularly, the thickness between the positive electrode and the negative electrode), and the average value of the measured values at optional 50 locations is used.

The electrolyte assists movement of metal ions released from the electrodes (positive electrode and negative electrode). The electrolyte may be a "non-aqueous" electrolyte, such as an organic electrolyte and an organic solvent, or an "aqueous" electrolyte including water. The secondary battery of the present disclosure is preferably a nonaqueous electrolyte secondary battery using an electrolyte including a "nonaqueous" solvent and a solute as an electrolyte. The electrolyte may have a form such as a liquid form or a gel form (in the present specification, the "liquid" nonaqueous electrolyte is also referred to as a "nonaqueous electrolyte solution").

A solvent including at least carbonate is preferable as a specific solvent of the nonaqueous electrolyte. Such carbonates may be cyclic carbonates and/or chain carbonates. The cyclic carbonates are not particularly limited, and examples thereof include at least one selected from the group consisting of propylene carbonate (PC), ethylene carbonate (EC), butylene carbonate (BC), and vinylene carbonate (VC). Examples of the chain carbonates include at least one selected from the group consisting of dimethyl carbonate (DMC), diethyl carbonate (DEC), ethyl methyl carbonate (EMC), and dipropyl carbonate (DPC). In a preferable embodiment of the present disclosure, a combination of cyclic carbonates and chain carbonates is used as the nonaqueous electrolyte, and for example, a mixture of ethylene carbonate and ethyl methyl carbonate is used.

For example, Li salts such as $LiPF_6$ and $LiBF_4$ are preferably used as a specific solute of the nonaqueous electrolyte.

The exterior body is not particularly limited, and may be, for example, a flexible pouch (soft bag) or a hard case (hard case).

When the exterior body is a flexible pouch, the flexible pouch is typically formed of a laminate film, and sealing is achieved by heat-sealing the peripheral edge portion. A film obtained by laminating a metal foil and a polymer film is widely used as the laminate film, and specific examples thereof include a film having a three-layer structure of outer layer polymer film/metal foil/inner layer polymer film. The outer layer polymer film is a film for preventing damage to the metal foil from permeation and contact of moisture and the like, and polymers such as polyamide and polyester can be preferably used. The metal foil is a foil for preventing permeation of moisture and gas, and a foil such as copper, aluminum, and stainless steel can be preferably used. The inner layer polymer film is a film for protecting the metal foil from the electrolyte housed inside and a film for melt-sealing in heat sealing, and polyolefin (for example, polypropylene) or acid-modified polyolefin can be preferably used. The thickness of the laminate film is not particularly limited, and is preferably, for example, 1 μm or more and 1 mm or less.

When the exterior body is a hard case, the hard case is typically formed of a metal plate, and sealing is achieved by irradiating the peripheral portion with laser. A metal material composed of aluminum, nickel, iron, copper, or stainless steel is widely used as the metal plate. The thickness of the metal plate is not particularly limited, and is preferably, for example, 1 μm or more and 1 mm or less.

EXAMPLES

A Si-based material (that is, silicon oxide) was prepared as a negative electrode active material core material.

Specifically, SiO (median diameter: 7 μm) and $SiTi_{0.3}$ (median diameter: 3 μm) were used.

The following compounds were prepared as the first metal alkoxide.

- tetraethoxysilane (corresponding to the compound (1A-1))
- tetrabutoxytitanium (corresponding to the compound (1B-1))
- triisopropoxyaluminum (corresponding to the compound (1C-1))

The following compounds were prepared as the second metal alkoxide.

- the compound (2A-1)
- the compound (2A-2)
- the compound (2D-1)
- the compound (2E-1)
- the compound (2F-1)

Example 1

(Production of Negative Electrode Active Material)

There was prepared 70 g of ethanol in which 10.0 g of 28% by mass of aqueous ammonia was dissolved. 60 g of SiO was added to this solution. Then, the first metal alkoxide and the second metal alkoxide were added so that the amount used with respect to 100 parts by mass of the added SiO was the ratio in Table 3. Thereafter, stirring was performed at room temperature (20° C.) for 120 minutes. The reaction solution was separated by filtration, washed with acetone, and the coated powder was dried at 80° C. for 120 minutes to be formed into a film (thickness: 3 nm) on the surface of SiO. Thus, there was completed the preparation of SiO coated with the organic-inorganic hybrid film (negative electrode active material).

(Method of Producing Battery)

Step of Producing Negative Electrode

The negative electrode was produced as follows. 28.79% by mass of the negative electrode active material, 67.16% by mass of a carbon-based active material (artificial graphite, median diameter D50=13 μm), 3.00% by mass of polyvinylidene fluoride, 1.00% by mass of acetylene black, 0.05% by mass of carbon nanotubes, and a solvent (that is, pure water) were mixed, and then the mixture was kneaded and stirred by using a rotation-revolution mixer to provide a negative electrode layer slurry. This negative electrode layer slurry was applied onto one surface of a 12 μm copper foil, dried at 120° C., pressurized to 1.7 g/cc with a hand press machine, and then vacuum-dried to produce a silicon/graphite mixed negative electrode. The thickness of the negative electrode layer was 36 μm.

Step of Producing Positive Electrode

The positive electrode was produced as follows. 98 parts by mass of a positive electrode active material (LiCoO2), 1 part by mass of a positive electrode binder (polyvinylidene fluoride), 1 part by mass of a positive electrode conductive agent (ketjen black), and an organic solvent (N-methyl-2-pyrrolidone) were mixed, and then the mixture was stirred (kneaded) by using a rotation-revolution mixer to provide a paste positive electrode layer slurry. Then, the positive electrode layer slurry was applied onto one surface of a positive electrode current collector (15 μm thick aluminum foil) by using a coating apparatus, and then the positive electrode layer slurry was dried (drying temperature=120° C.) to form a positive electrode layer. Finally, the positive electrode layer was compression-molded by using a hand press machine, and then the positive electrode layer was vacuum-dried. In this case, the volume density of the positive electrode layer was set to 3.7 g/cc (=3.7 g/cm$^3$).

Step of Producing Coin Cell

A microporous film composed of polyethylene and having a thickness of 25 μm was used as a separator. A 2016 size coin cell was produced by using an electrolytic solution in which LiPF6 was dissolved at a concentration of 1 mol/kg in a solvent having a mass ratio of ethylene carbonate (EC)/dimethyl carbonate (DMC)/fluoroethylene carbonate (FEC)=32/65/3.

Discharge Capacity Retention Ratio

Using a coin cell, 100 cycles of charge and discharge were performed under the following conditions.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Specifically, the secondary battery was charged and discharged for one cycle in an ambient temperature environment (23° C.) in order to stabilize the battery state. In charge of the 1st cycle, charge was performed at a current of 0.2 C until the voltage reached 4.4 V, and then charge was further performed at a voltage of 4.4 V until the current reached 0.025 C. In discharge of the 1st cycle, discharge was performed at a current of 0.2 C until the voltage reached 2.5 V. Then, the secondary battery was repeatedly charged and discharged until the total number of cycles reached 100 cycles in the same environment, and the discharge capacity was measured. In charge after the 2nd cycle, charge was performed at a current of 0.5 C until the voltage reached 4.4 V, and then charge was further performed at a voltage of 4.4 V until the current reached 0.025 C. In discharge after the 2nd cycle, discharge was performed at a current of 0.5 C until the voltage reached 2.5 V. "0.2 C" is a current value at which discharge of the battery capacity (theoretical capacity) is completed in 5 hours. "0.025 C" is a current value at which discharge of the battery capacity is completed in 40 hours. "0.5 C" is a current value at which discharge of the battery capacity is completed in 2 hours. Finally, the discharge capacity retention ratio was determined and evaluated by substituting the discharge capacity in discharge at the 2nd cycle and the discharge capacity in discharge at the 100th cycle into the following formula.

⊙⊙: 93% or more (best);
⊙: 90% or more and less than 93% (excellent);
○: 85% or more and less than 90% (good); and
X: less than 85% (problematic).

Discharge capacity retention ratio [%] = [Mathematical Formula 1]

(Discharge capacity in discharge at the

-continued $$\text{100th cycle})/(\text{Discharge capacity in discharge at the 2nd cycle})\times 100$$

Discharge Load Retention Ratio

Using a coin cell, charge and discharge were performed under the following conditions.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Two $R^{211}$s and two $R^{212}$s may be each independently selected from $R^{21}$ of the general formula (2), or may be mutually the same groups.

Specifically, the secondary battery was further charged and discharged for 3 cycles while changing the current during discharge in a normal temperature environment (23° C.) by using the secondary battery (charged and discharged for 1 cycle) whose battery state was stabilized by the same procedure as in the case of examining the discharge capacity retention ratio (cycle characteristics), and the discharge capacities at the 2nd cycle and the 4th cycle were measured. In charge of the 2nd to 4th cycles, charge was performed at a current of 0.2 C until the voltage reached 4.4 V, and then charge was further performed at a voltage of 4.4 V until the current reached 0.025 C. In discharge of the 2nd cycle, discharge was performed at a current of 0.2 C until the voltage reached 2.5 V. In discharge of the 3rd cycle, discharge was performed at a current of 0.5 C until the voltage reached 2.5 V. In discharge of the 4th cycle, discharge was performed at a current of 2 C until the voltage reached 2.5 V. From this measurement result, the discharge load retention ratio was obtained and evaluated based on the following formula. "2 C" is a current value at which discharge of the battery capacity is completed in 0.5 hours.

⊙⊙: 90% or more (best);

⊙: 85% or more and less than 90% (excellent);

○: 80% or more and less than 85% (good); and

X: less than 80% (problematic).

[Mathematical Formula 2]

$$\text{Discharge load retention ratio [\%]} = (\text{Discharge capacity in discharge at the 4th cycle (discharge current} = 2C)/\text{Discharge capacity in discharge at the 2nd cycle (discharge current} = 0.2C))\times 100$$

Examples 2 to 20 and Comparative Examples 1 to 3

Production of a battery and evaluation of battery characteristics were performed in the same manner as in Example 1, except that in the production of the negative electrode active material, the types and blending amounts of the first metal alkoxide and the second metal alkoxide were changed as shown in Table 3.

TABLE 3

| | | Blending account (parts by mass) (1) | | | | | | | | Hybrid film | | Battery evaluation | |
|---|---|---|---|---|---|---|---|---|---|---|---|---|---|
| | Type of active | First metal alkoxide | | Second metal alkoxide type/amount y | | | | | | Composition | Coating amount (% | 100 cycle discharge capacity retention | 2 C discharge load retention |
| | material | type/amount x | | c | 2A-2 | 2F-1 | 2D-1 | 2E-1 | | x/y (2) | by mass) (3) | ratio [%] | ratio [%] |
| Comparative Example 1 | SiO | 1A-1 | 1.5 | — | — | — | — | — | | 100/0 | 0.43 | 84X | 84○ |
| Comparative Example 2 | SiO | 1A-1 | 7.0 | — | — | — | — | — | | 100/0 | 1.63 | 78X | 65X |
| Example 1 | SiO | 1A-1 | 1.05 | 0.45 | — | — | — | — | | 70/30 | 0.52 | 93⊙⊙ | 93⊙⊙ |
| Example 2 | SiO | 1A-1 | 4.9 | 2.1 | — | — | — | — | | 70/30 | 2.39 | 92⊙ | 81○ |
| Example 3 | SiO | 1A-1 | 1.4 | — | 0.6 | — | — | — | | 70/30 | 0.75 | 93⊙⊙ | 87 |
| Example 4 | SiO | 1A-1 | 6.3 | — | 0.7 | — | — | — | | 90/10 | 2.18 | 91⊙ | 80○ |
| Example 5 | SiO | 1A-1 | 1.05 | — | — | 0.45 | — | — | | 70/30 | 0.60 | 93⊙⊙ | 85⊙ |
| Example 6 | SiO | 1A-1 | 1.4 | — | — | — | 0.6 | — | | 70/30 | 0.77 | 94⊙⊙ | 92⊙⊙ |
| Example 7 | SiO | 1A-1 | 4.9 | — | — | — | 2.1 | — | | 70/30 | 2.64 | 92⊙ | 81○ |
| Example 8 | SiO | 1A-1 | 1.05 | — | — | — | — | 0.45 | | 70/30 | 0.66 | 91⊙ | 90⊙⊙ |
| Example 9 | SiO | 1A-1 | 4.9 | — | — | — | — | 2.1 | | 70/30 | 3.01 | 92⊙ | 82○ |
| Example 10 | SiO | 1A-1 | 0.7 | 0.3 | — | — | — | — | | 70/30 | 0.35 | 93⊙⊙ | 90⊙⊙ |
| Example 11 | SiO | 1A-1 | 1.35 | 0.15 | — | — | — | — | | 90/10 | 0.46 | 93⊙⊙ | 87⊙ |
| Example 12 | SiO | 1A-1 | 0.45 | 1.05 | — | — | — | — | | 30/70 | 0.64 | 93⊙⊙ | 90⊙⊙ |
| Example 13 | SiO | 1A-1 | 0.7 | — | — | — | 0.3 | — | | 70/30 | 0.39 | 93⊙⊙ | 90⊙⊙ |

TABLE 3-continued

| | | | | | | | | | | | Battery evaluation | |
|---|---|---|---|---|---|---|---|---|---|---|---|---|
| | | Blending account (parts by mass) (1) | | | | | | | Hybrid film | | 100 cycle discharge | 2 C discharge |
| | Type of active | First metal alkoxide | | Second metal alkoxide type/amount y | | | | | Composition | Coating amount (% | capacity retention | load retention |
| | material | type/amount x | | c | 2A-2 | 2F-1 | 2D-1 | 2E-1 | x/y (2) | by mass) (3) | ratio [%] | ratio [%] |
| Example 14 | SiO | 1A-1 | 1.35 | — | — | — | 0.15 | — | 90/10 | 0.48 | 93⊙⊙ | 87⊙ |
| Example 15 | SiO | 1A-1 | 0.75 | — | — | — | 0.75 | — | 50/50 | 0.68 | 94⊙⊙ | 90⊙⊙ |
| Example 16 | SiO | 1A-1 | 0.45 | — | — | — | 1.05 | — | 30/70 | 0.77 | 93⊙⊙ | 91⊙⊙ |
| Example 17 | SiO | 1B-1 | 1.4 | — | — | — | 0.9 | — | 61/39 | 0.95 | 94⊙⊙ | 91⊙⊙ |
| Example 18 | SiO | 1C-1 | 1.4 | 0.9 | — | — | — | — | 61/39 | 0.84 | 92⊙ | 88⊙ |
| Comparative Example 3 | $SiTi_{0.3}$ | 1A-1 | 1.5 | — | — | — | — | — | 100/0 | 0.43 | 81X | 88⊙ |
| Example 19 | $SiTi_{0.3}$ | 1A-1 | 0.75 | — | — | — | 0.75 | — | 50/50 | 0.68 | 93⊙⊙ | 94⊙⊙ |
| Example 20 | $SiTi_{0.3}$ | 1B-1 | 1.4 | — | — | — | 0.9 | — | 61/39 | 0.95 | 93⊙⊙ | 95⊙⊙ |

"—" means that blending amount is 0 parts by mass.
* means no measurement
(1) value with respect to 100 parts by mass of negative electrode active material core material
(2) ratio (% by mass) at x + y = 100
(3) ratio with respect to coated negative electrode active material The secondary battery according to the present disclosure can be used in various fields where electric storage is assumed. For example merely, the secondary battery, particularly nonaqueous electrolyte secondary battery, according to the present disclosure can be used: in the fields of electricity, information, and communication (mobile device fields such as mobile phones, smartphones, smart watches, laptops, digital cameras, activity meters, arm computers, and electronic paper); in home and small industrial applications (for example, the fields of electric tools, golf carts, and home, nursing, and industrial robots); in large industrial applications (for example, the fields of forklift, elevator, and harbor crane); in transportation system fields (for example, the field of hybrid vehicles, electric vehicles, buses, trains, power-assisted bicycles, and electric two-wheeled vehicles); in power system applications (for example, the fields of various types of power generation, road conditioners, smart grids, and household power storage systems); in medical applications (medical equipment fields such as earphone hearing aids); in pharmaceutical applications (for example, the field of dosage management systems); and IoT fields and space and deep sea applications (for example, the fields of a space probe and a submersible).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode active material for a battery, comprising:

a negative electrode active material core material; and a film provided on a surface of the negative electrode active material core material, wherein the film includes an organic-inorganic hybrid film having a reactant at least including:

a first metal alkoxide including no metal atom-carbon atom bond in a molecule; and a second metal alkoxide including two or more of metal atom-carbon atom bonds in a molecule;

the second metal alkoxide is a compound represented by a following general formula (2A), (2B), (2C), (2E) or (2F), or a mixture thereof:

$$(R^{211}O),{}_3Si—R^{31}—Si(OR^{212})_3 \quad (2A)$$

wherein $R^{211}$ and $R^{212}$ each independently represent an alkyl group having 1 to 10 carbon atoms:

$R^{31}$ represents a divalent hydrocarbon group having 1 to 20 carbon atoms;

(2B)

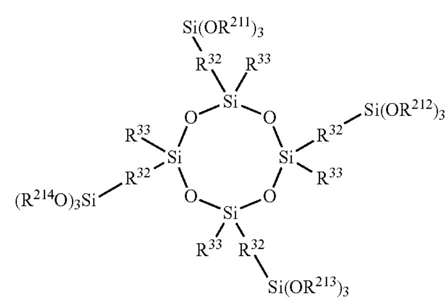

wherein $R^{211}$, $R^{212}$, $R^{213}$, and $R^{214}$ each independently represent an alkyl group havig 1 to 10 carbon atoms;

$R^{32}$ represents a divalent hydrocarbon group having 1 to 20 carbon atoms;

$R^{33}$ represents a monovalent hydrocarbon group having 1 to 10 carbon atoms;

$$(R^{211})_3Si—R^{34}—NH—R^{35}—NH—R^{36}—Si(OR^{212})_3 \quad (2C)$$

wherein $R^{211}$ and $R^{212}$ each independently represent an alkyl group having 1 to 10 carbon atoms;

$R^{34}$, $R^{35}$, and $R^{36}$ each independently represent a divalent hydrocarbon group having 1 to 10 carbon atoms;

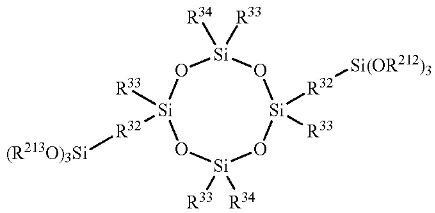

(2E)

wherein $R^{212}$ and $R^{213}$ each independently represent an alkyl group having 1 to 10 carbon atoms;

$R^{32}$ represents a divalent hydrocarbon group having 1 to 20 carbon atoms;

$R^{33}$ represents a monovalent hydrocarbon group having 1 to 10 carbon atoms:

and $R^{34}$ represents a monovalent hydrocarbon group having 1 to 30 carbon atoms;

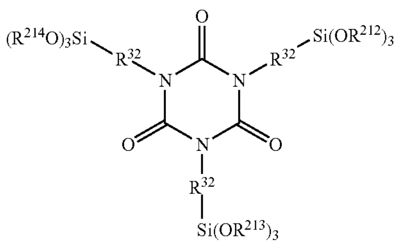

(2F)

wherein $R^{212}$, $R^{213}$, and $R^{214}$ each independently represent an alkyl group having 1 to 10 carbon atoms; and wherein $R^{32}$ represents a divalent hydrocarbon group having 1 to 20 carbon atoms.

2. The negative electrode active material according to claim 1, wherein the first metal alkoxide includes a compound represented by a following general formula (1):

$$M^1(OR^1)_x \quad (1)$$

wherein, $M^1$ represents Si, Ti, Al, or Zr;

x represents the valence of $M^1$ and is an integer of 3 or 4; and $R^1$ each independently represents an alkyl group having 1 to 10 carbon atoms or —C($R^2$)=CH—CO—$R^3$, wherein $R^2$ represents an alkyl group having 1 to 10 carbon atoms, and $R^3$ represents an alkyl group having 1 to 30 carbon atoms, an alkyloxy group having 1 to 30 carbon atoms, or an alkenyloxy group having 1 to 30 carbon atoms.

3. The negative electrode active material according to claim 1, wherein the second metal alkoxide includes two or more Si atom-carbon atom bonds in the molecule.

4. The negative electrode active material according to claim 2, wherein the second metal alkoxide includes two or more Si atom-carbon atom bonds in the molecule.

5. The negative electrode active material according to claim 1, wherein the film comprises 10% by mass or more and 95% by mass or less of the first metal alkoxide and 5% by mass or more and 90% by mass or less of the second metal alkoxide with respect to a total amount of the film.

6. The negative electrode active material according to claim 2, wherein the film comprises 10% by mass or more and 95% by mass or less of the first metal alkoxide and 5% by mass or more and 90% by mass or less of the second metal alkoxide with respect to a total amount of the film.

7. The negative electrode active material according to claim 3, wherein the film comprises 10% by mass or more and 95% by mass or less of the first metal alkoxide and 5% by mass or more and 90% by mass or less of the second metal alkoxide with respect to a total amount of the film.

8. The negative electrode active material according to claim 4, wherein the film comprises 10% by mass or more and 95% by mass or less of the first metal alkoxide and 5% by mass or more and 90% by mass or less of the second metal alkoxide with respect to a total amount of the film.

9. The negative electrode active material according to claim 1, wherein the film comprises 10% by mass or more and 95% by mass or less of the first metal alkoxide and 5% by mass or more than 90% by mass or less of the second metal alkoxide with respect to a total amount of the film.

10. The negative electrode active material according to claim 1, wherein a content of the film is 0.20% by mass or more and 4.00% by mass or less with respect to a total amount of the negative electrode active material.

11. The negative electrode active material according to claim 1, wherein the negative electrode active material core material comprises at least Si.

12. The negative electrode active material according to claim 1, wherein the battery includes a lithium ion secondary battery.

13. A negative electrode, comprising:

a negative electrode layer including the negative electrode active material according to claim 1; and a negative electrode current collector.

14. A secondary battery, comprising:

the negative electrode according to claim 13;

a positive electrode;

a separator provided between the positive electrode and the negative electrode; and an electrolyte that are enclosed in an exterior body.

15. The secondary battery according to claim 14, wherein the electrolyte includes a nonaqueous electrolyte.

16. The secondary battery according to claim 14, wherein the positive electrode and the negative electrode are electrodes configured to receive and release lithium ions.

17. The secondary battery according to claim 15, wherein the positive electrode and the negative electrode are electrodes configured to receive and release lithium ions.

18. A method of making the negative electrode active material according to claim 1, the method comprising stirring a negative electrode active material core material together with a first metal alkoxide and a second metal alkoxide in an alkaline solvent.

* * * * *